United States Patent
Rossomando

(10) Patent No.: US 6,910,204 B1
(45) Date of Patent: Jun. 21, 2005

(54) SOFTWARE DEVELOPMENT METHODOLOGY INCLUDING CREATION OF FOCUS AREAS AND DECOMPOSITION OF SAME TO CREATE USE CASES

(75) Inventor: Philip J. Rossomando, Glenmoore, PA (US)

(73) Assignee: Unisys Corporation, Blue Bell, PA (US)

( * ) Notice: Subject to any disclaimer, the term of this patent is extended or adjusted under 35 U.S.C. 154(b) by 467 days.

(21) Appl. No.: 09/834,357

(22) Filed: Apr. 13, 2001

(51) Int. Cl.[7] .............................................. G06F 9/44
(52) U.S. Cl. ...................................... 717/108; 717/122
(58) Field of Search ................................ 717/100–123

(56) References Cited

U.S. PATENT DOCUMENTS

| | | | |
|---|---|---|---|
| 5,729,747 A * | 3/1998 | Tsukakoshi | 717/106 |
| 6,253,369 B1 * | 6/2001 | Cloud et al. | 717/136 |
| 6,385,763 B1 * | 5/2002 | Meyer et al. | 717/100 |
| 6,606,740 B1 * | 8/2003 | Lynn et al. | 717/100 |

* cited by examiner

Primary Examiner—Tuan Dam
Assistant Examiner—Chuck Kendall
(74) Attorney, Agent, or Firm—Lise A. Rode; Mark T. Starr; Woodcock Washburn

(57) ABSTRACT

A methodology for creating Unified Modeling Language (UML) use cases by decomposing a business process into one or more levels of focus areas. A top-level focus area defines the business process and a set of participants therein. The top-level focus area is decomposed by identifying divisible aspects or subsets of the business process, and by identifying the various roles played by the participants. The result of this decomposition is one or more sub-focus areas, each having associated therewith a set of participants based on the top-level participants. The focus areas and participants are recursively decomposed level-by-level until a set of bottom-level focus areas is obtained satisfying the condition that each participant has only one role. When this condition is met, the bottom-level focus areas may be modeled as UML business use cases and used to develop software that meets the specified business process.

23 Claims, 7 Drawing Sheets

SOFTWARE DEVELOPMENT METHODOLOGY INCLUDING CREATION OF FOCUS AREAS AND DECOMPOSITION OF SAME TO CREATE USE CASES

FIELD OF THE INVENTION

The invention relates generally to the field of computer-assisted software engineering. More particularly, the invention provides a technique for developing software by hierarchically decomposing a set of general requirements for the software and a set of multiple role participants into a set of use cases, where each use case covers the usage of the software by a sub-participant having a single role.

BACKGROUND OF THE INVENTION

Fundamentally, a software application is a set of instructions that can be followed by a computer to perform one or more tasks. Traditionally, a software application was designed by identifying the task(s) to be performed and writing instructions to perform those tasks in a programming language, such as C or C++. The disadvantage to this traditional approach is that it requires the software developer to model the development process in terms of the low-level actions that a computer can be instructed to perform, rather than in terms of the contemplated use of the software by actual business users. For example, if the software to be developed is an organization-wide scheduling system for a university, the traditional approach to software development may require the developer to model the problem in terms of how calendars are represented as data structures and manipulated arithmetically, how users are uniquely identified within the system, etc. This type of model for the software is at a much "lower-level" than the business problem that the software is intended to solve.

Software development tools, such as the RATIONAL ROSE visual modeling tool from Rational Software Corporation, seek to improve on the traditional software development process by allowing the function of the software to be modeled at a relatively higher level of abstraction. With RATIONAL ROSE, instead of modeling the requirements for software in terms of the basic actions to be performed by a computer, a software developer can abstract the software under development in terms of "use cases" and object models. A "use case" is an instance of the use of the software by an actor. For example, in the scheduling system mentioned above, a use case might be a calendar owner's scheduling of a personal appointment on his or her calendar. Having identified one or more such use cases, the software developer can build the software by separately modeling and then coding each of the use cases.

Use cases are a useful abstraction because they allow the software developer to create software with a view toward specific situations that the software will be expected to handle. However, use cases still have the drawback of being, in many situations, at a much lower level of abstraction than the requirements for which the software is designed. Software is generally envisioned to meet the requirements of a business model, and a business model is usually conceived as a high-level plan to implement a business process, rather than as a collection of specific examples of how the software will be used. For example, the management of a university (which, in many cases, is composed of a group of non-programmers) may envision a scheduling system that meets certain requirements and solves certain scheduling problems. However, the management's vision for such a system is not likely to be at a level of detail that includes all of the exemplary uses of the system (e.g., scheduling a personal appointment, scheduling a university-wide event, canceling an appointment, deleting from the system a user who has left the university, etc.). The programmers who will ultimately implement the system, however, need to understand the lower-level use cases in order to implement a system that will meet all of the high-level requirements of the system. In this sense, there is often a disconnect between the language of the business people who envision the software and the needs of the programmers who design and implement the system. This disconnect may result in the software developers' failure to capture all of the use cases because they do not fully appreciate the nature of the business process that they will implement. Alternatively, the disconnect may result in software that does not quite meet the task for which it was created because the development process is driven more by the programmers' need to "fit" a business process onto a set of use cases, rather than the need to capture the true essence of the business process in the form of software.

In view of the foregoing, there is a need for a software development tool that overcomes the drawbacks of the prior art.

SUMMARY OF THE INVENTION

The present invention provides a method and tool for designing software by facilitating the identification of use cases based on a high-level business model of the software. When a business plan for the software is specified, one or more "focus areas" are identified. Each focus area includes a set of "requirements" for the system. These requirements include a general description of a process to be performed by the system (e.g., a business process, such as the scheduling system mentioned above), as well as any constraints on the manner in which the process is to be performed. The focus area also includes a set of "participants" who will interact with the specified process. Significantly, each participant may have one or more identifiable "roles." For example, one participant in a university-wide scheduling system might be a professor at the university. The professor may have various roles as a participant in the system: e.g., the roles of personal-event-scheduler, university-wide-event scheduler, and invitee to an event.

The focus area may be decomposed into several "sub"-focus areas. Sub-focus areas are created by identifying one or more aspects of the original focus area. Each sub-focus area includes those portions of the requirements that pertain to a particular aspect. For example, in a scheduling system, two aspects of the system might be the scheduling of university-wide events and the scheduling of personal events. Each of these aspects constitutes a sub-focus area. Each sub-focus area has a set of one or more participants who are defined by their interaction with the requirements of the sub-focus area. For example, the participant in the personal-event-scheduling sub-focus area may be that of the "personal-event scheduler," which is one of the roles played by the professor participant in the original focus area. Thus, the participants of the original focus area are decomposed in a manner that meets the decomposition of the sub-focus area. Each "sub"-focus area is actually its own focus area, although at a "lower" level than the focus area from which it is derived. Focus areas are decomposed recursively into lower and lower levels until each of the sub-participants (i.e., actors) in the tasks covered by the lowest level focus area has only one role. A focus area where all of the participants have only one role is analogous to a "business use case," which may then be modeled by conventional means—e.g., the RATIONAL ROSE tool described above.

According to the method of the present invention, requirements for the software are specified for the top-level focus area. When the next-lower-level focus area is generated, the requirements specified at a previous level are propagated down to the next level. The software developer is then able to consider these requirements and how they would apply to the lower-level focus area. This consideration may yield a new set of requirements based on the original requirements, where the new requirements are directed to particular development issues that pertain to the lower-level focus area. These new requirements, in turn, may be further propagated to lower-level focus areas. This process of propagation is repeated until the lowest-level focus area is generated. Preferably, a list of "assumptions" (i.e., assumptions that have been made in the development process) is also generated for the top-level focus area and is propagated in a manner similar to the requirements. Propagating the requirements and assumptions through the decomposition process level-by-level allows the software developer to consider how these requirements and assumptions should be addressed for each of several manageably-sized portions of the entire development project (i.e., the lower-level focus areas), and thus offers the advantage that it assists the software developer in capturing all of the necessary use cases.

The creation and decomposition of focus areas and associated participants may be performed using a business development tool, such as the MooD® business developer provided by The Salamander Organization. These focus area and identified use case artifacts may then be converted to equivalent focus area and UML use case artifacts within for example RATIONAL ROSE—e.g., by configuring MooD® to export these items as specifications in the extensible Markup Language (XML), which can then be read into RATIONAL ROSE by an XMI interface.

Other features of the invention are described below.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF THE INVENTION

Overview

When the software industry was in its infancy, software was typically envisioned, designed, and written by programmers. In general, programmers would attempt to understand a problem that existed in the business world, and would then write software to solve the problem as they perceived it. As the software development industry has matured, the process of software development has shifted from a focus on what problems software developers are able to solve to a focus on the processes that business people need to automate. The present invention provides a methodology for developing software based on a business process by decomposing the business process level by level until the process has been decomposed into the low-level constructs needed by programmers to implement the software. This methodology helps to prevent important aspects of the business process from being lost in the course of translating the high-level vision of a business process into the low-level constructs required by programmers to implement the software.

It should be understood that the methodology disclosed below can be implemented with the aid of software development tools that execute on a computing device. Such software development tools may be embodied in the form of program code (i.e., instructions) stored on a computer-readable medium, such as a magnetic, electrical, or optical storage medium, including without limitation a floppy diskette, CD-ROM, CD-RW, DVD-ROM, DVD-RAM, magnetic tape, flash memory, hard disk drive, or any other machine-readable storage medium, wherein, when the program code is loaded into and executed by a machine, such as a computer, the machine becomes an apparatus for practicing the invention. The present invention may also be embodied in the form of program code that is transmitted over some transmission medium, such as over electrical wiring or cabling, through fiber optics, over a network, including the Internet or an intranet, or via any other form of transmission, wherein, when the program code is received and loaded into and executed by a machine, such as a computer, the machine becomes an apparatus for practicing the invention. When implemented on a general-purpose processor, the program code combines with the processor to provide a unique apparatus that operates analogously to specific logic circuits.

Process of Software Development

Figure 1:
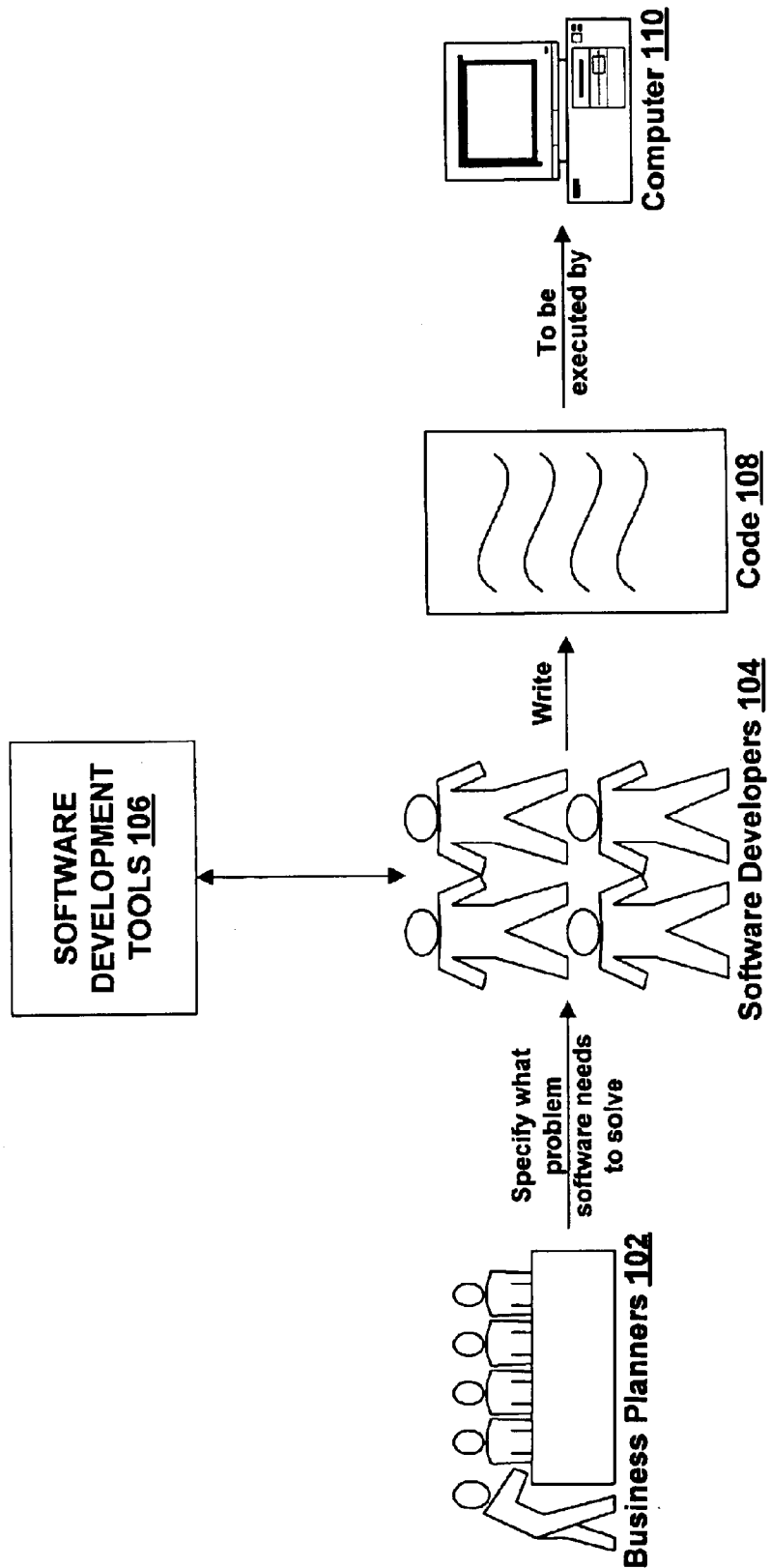
FIG. 1 is a flow diagram showing a process of developing software based on a description of a problem that the software is intended to solve.

FIG. 1 is a flow diagram showing a process of developing software. Software generally begins with a definition of the problem that the software is intended to solve. For example, in the business world, business planners 102 specify a problem that can be solved through appropriately configured software. Business planners 102 may be any person or group that identifies the software needs of an organization—e.g., the board of directors of a corporation, the board of regents of a university, a project manager or group manager for a division within a company, a consultant hired by a company, etc. The specification of the problem that the software is intended to solve may, for example, include a list of participants who will use the software, as well as a general set of functions that the participants will be able to perform with the software.

The specification of the problem that the software is intended to solve (i.e., the "requirements" for the software) is provided to software developers 104. Software developers 104 and business planners 102 are typically different groups of people; it is often the case that the people who envision the need for software are not the same people who will actually design and implement the software. Software developers 104 design software based on the requirements received from business planners 102. In designing the software, software developers 104 may use software development tools 106. A non-limiting example of software development tools 106 is the RATIONAL ROSE visual modeling tool from Rational Software Corporation. The RATIONAL ROSE tool creates a visual model of the artifacts of software systems that have been specified in the Unified Modeling Language (UML). In order to use a visual modeling tool to assist in designing the software, software developers 104 prepare a set of "use cases." Briefly, a use case is a specific instance of the use of the software under development by an actor. Within UML, a "use case" is formally defined as a collection of classes, interfaces, and other elements that work together to provide some behavior that is bigger than the behavior represented by the sum of the parts, which yields an observable result to one or more actors. In order to use software development tools 106, software developers 104 create a set of use cases that define various instances of the software that has been specified by business planners 102. The exemplary software development tool 106 may create a visual model of the use cases as an aid to software developers 104 in coding the software.

Based on the defined use cases, software developers 104 create code 108 to implement the various use cases. The code serves as instructions to computer 110 to perform the functions envisioned by business planners 102.

Focus Area Hierarchy

As noted above, UML provides the constructs of use cases and actors, which are useful for the modeling of software. The present invention provides the additional constructs of "focus area" and "participant," which are at a higher level of abstraction than use cases and actors. A "focus area" is an identifiable business process associated with a definite goal, exhibiting strong cohesion and weak coupling with other focus areas.

Figure 2:
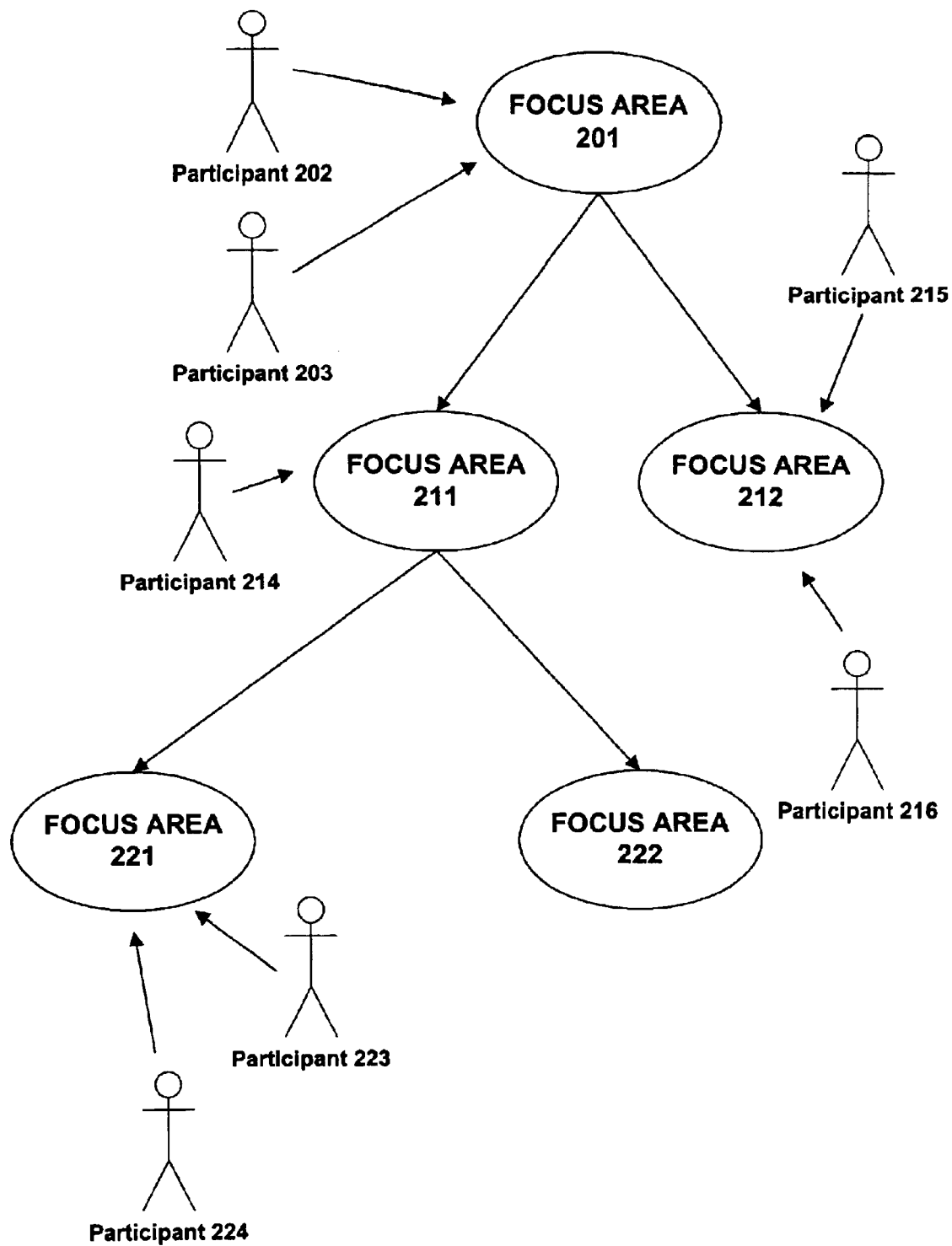
FIG. 2 is a block diagram showing a hierarchy of focus areas and participants, decomposed by levels in accordance with the invention.

FIG. 2 shows a plurality of focus areas and participants, as well as a hierarchy 200 in which such focus areas and participants are organized. At the top level of hierarchy 200 is focus area 201. Focus area 201 represents a business process. The business process represented by a focus area 201 may be a process that business planners 102 have determined should be implemented by software. For example, the business process may be a university-wide scheduling system for a particular university. Participants 202 and 203 participate in the process defined by focus area 201. For example, participant 202 may be a professor at the university, and participant 203 may be a student.

Focus area 201 may be "decomposed" into focus areas 211 and 212. It will be appreciated that a university-wide scheduling system is a broad concept that may have many different aspects. For example, one aspect of a scheduling system is that it permits its users to schedule events. Another aspect is that a system administrator may be able to add users to, and delete users from, the system. These aspects of a scheduling system are different, in the sense that they represent different types of actions within the system, and may require different types of interaction with the system's users. Thus, a user who is performing scheduling tasks will interact with the system differently (e.g., by issuing different commands, using different interfaces, etc.) than a user who is performing administrative tasks such as adding a user to, or deleting users from, the system. In this case, focus area 211 may represent the event-scheduling aspect of the system, and focus area 212 may represent the administrative aspect of the system.

Focus areas 211 and 212 are at a "lower level" in hierarchy 200 than focus area 201, in the sense that focus areas 211 and 212 are derived from higher level focus area 201. Each of the focus areas 211 and 212 represents some subset or aspect of the process that the higher level focus area represents. However, focus areas 211 and 212 typically define their respective aspects of the overarching business process in greater detail than the higher level focus area from which they are derived. For example, while focus area 212 may represent only the administrative aspect of a university-wide scheduling system, focus area 212 may define this aspect in relatively greater detail than higher-level focus area 201. That is, the need for system administration may be briefly noted or implied in the process described in focus area 201, but focus area 212 may describe such administration in greater detail, specifying for example what types of activities take place during the administration of a scheduling system.

Focus areas 211 and 212 may each have their own set of participants 214, 215, and 216, which may be different from participants 202 and 203 associated with focus areas. Participants 214, 215 and 216 have roles that are related to the aspect of the business process represented by focus areas 202 and 203. For example, participant 214 may be an "event scheduler" who participates in the event-scheduling process represented by focus area 211. Moreover, participants 214, 215 and 216 have roles that correspond to identifiable aspects of the roles assumed by participants 202 and 203 in higher-level focus area 201. For example, the designation of participant 214 as an "event scheduler" may be derived from the observation that participant 202 (the "professor") may sometimes behave as an event scheduler. (It should also be observed that the student participant 203 may sometimes behave as an event scheduler; thus the decomposed role of event-scheduler participant 214 may be derived from common aspects shared by higher level participants 202 and 203.)

Any of the lower-level focus areas may be further decomposed. For example, focus area 211, which is in the second level of hierarchy 200, may be further decomposed into focus areas 221 and 222, which are in a third level of hierarchy 200. For example, if focus area 211 represents the event-scheduling portion of the process represented by top-level focus area 201, then this event-scheduling focus area may be further decomposed into personal event scheduling (focus area 221) and university-wide event scheduling (focus area 222). This is a useful abstraction, because scheduling personal events and scheduling university-wide events may present different issues. For example, the scheduling of events on a personal calendar may be constrained as to who is permitted to schedule events on the calendar (e.g., the calendar owner and his or her secretary), the fact that two events on the calendar should not be scheduled at the same time, etc. On the other hand, the scheduling of university-wide events may present different concerns: for example, unlike a personal event which anyone can schedule for himself or herself, university-wide events may only be schedulable by professors; moreover, university-wide events may be scheduled at the same time, since different events may be attended simultaneously by different members of the university. These differing concerns may require different sub-processes within the software that implements the overall scheduling system. Thus, it is useful to decompose these sub-focus areas into further sub focus areas.

Each of the third-level focus area 221 and 222 has its own participants, which may be different from the participants in the higher-level focus areas. For example, focus area 221 may have a "personal-event scheduler" as its participant 223, and focus area 222 may have a "university-wide-event scheduler" as its participant 224.

Focus areas are recursively decomposed to an arbitrary number of levels down from the top level focus area, until the focus areas at the bottom of hierarchy 200 have participants each of whom has only one "role." Such a situation is equivalent to a business use case in UML, where the participants are "actors" within the meaning of UML. Once focus areas have been decomposed to that point, the resulting bottom level focus areas may be modeled as business use cases, and may be addressed in the same manner as any other UML description—e.g., the resulting use cases may be modeled and analyzed using the RATIONAL ROSE visual modeling tool for example.

It should be noted that a temporal relationship between focus areas within a given hierarchy may be specified. That is, inasmuch as focus areas at a given level each represent some aspect or subset of a larger process, a temporal relationship between these subsets may be specified. For example, if appropriate, it may be specified that actions in focus area 221 must take place before (or after) actions in focus area 222.

Methodology of Creating Use Cases by Using Focus Areas

Figure 3:
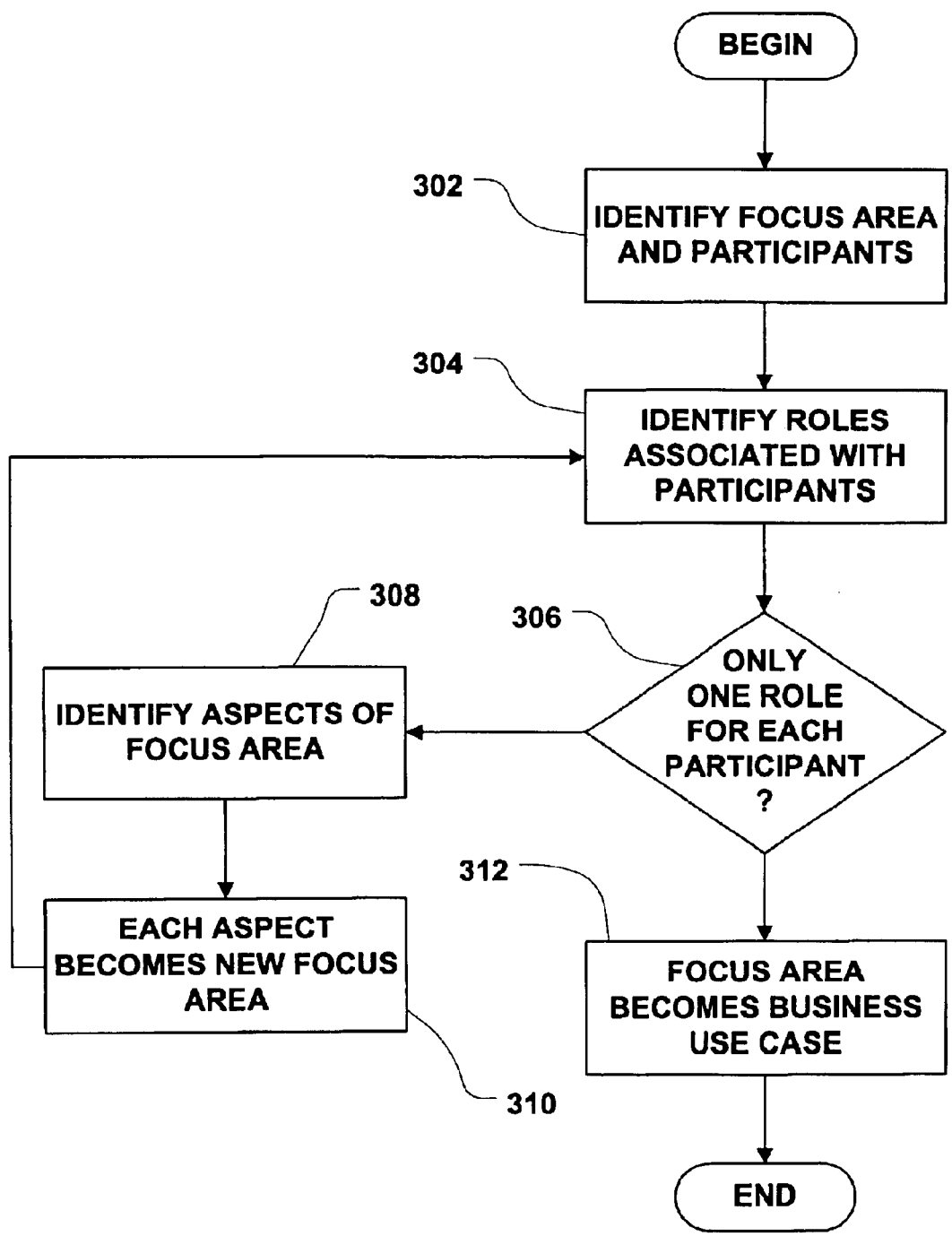
FIG. 3 is a flow diagram of a process of decomposing focus areas into use cases in accordance with the invention.

FIG. 3 shows an exemplary process for creating use cases by identifying and decomposing focus areas, in accordance with the present invention.

At step 302, a focus area (e.g., focus area 201, shown in FIG. 2) is identified. Typically, the focus area identified at step 302 is a high-level specification of a business process to be performed by the software under development. Also at step 302, a set of "participants" are identified who will participate in the business process carried out by the software (e.g., participants 202 and 203, shown in FIG. 2). In the example discussed above in connection with FIG. 2, the business process to be implemented by software is a university-wide scheduling system. Thus, step 302 may include a software development team's discussing the plans for a scheduling system with the university administration and identifying the administration's requirements for such a system in the form of a focus area specification.

At step 304, the roles associated with each of the participants are identified. A role represents the behavior of a participant (or the common behavior of plural participants) with respect to an aspect of a business process. It will be appreciated that a business process, such as a scheduling system, typically has many aspects. As described above in the example of FIG. 2, a scheduling system may include sub-systems for event scheduling and system administration - each of which is a different aspect of the system. In the above example, a professor can be both an event scheduler and an invitee to an event. These roles are separate and distinct with respect to the overall business process in the sense that, when a professor schedules an event, he behaves differently with respect to the software (e.g., entering different commands, using different interfaces, etc.) than he would behave if he were receiving an invitation to an event. Thus, a participant can have plural roles corresponding to different aspects of the system. (It will be observed that a participant need not have a role for every aspect of the system. For example, professors may not be permitted to perform administrative tasks which are reserved for computer-system administrators, and thus the professor has no role with respect to the system administration aspect of the scheduling system.)

Thus, at step 304, each participant is separated (or "decomposed") into the various roles that he may play with respect to the focus area. At step 306, a determination is made as to whether each participant in the focus area has only one role. The condition of each participant's having only one role is significant because such a condition may correspond to a business use case in UML. Thus, such a situation can be modeled using a conventional tool such as the RATIONAL ROSE tool. Therefore, if it is determined at step 306 that each participant in the focus area has only one role, then the focus area becomes a business use case (step 312). The following conditions of the focus area are factors to be considered in determining whether a focus area corresponds to a UML business use case:

Atomic roles (i.e., actors), not participants, are of primary interest.

The interaction between proposed focus areas is not as important as the activities captured within them.

The business goal being addressed is primitive and not divisible into other focus areas.

The captured activity is a sequence of steps performed by one or more actors in association with the system under development.

The contained business events cannot be decomposed further.

When one or more of these conditions apply to the lowest-level set of focus areas, it is likely that the participants in such lowest-level focus areas cannot be meaningfully decomposed into separate roles; in this case, the level of a UML business use case has been reached.

If it is determined at step 306 that at least one of the participants has more than one role, then it is necessary to decompose the focus area further. Thus, the process continues to step 308. At step 308, aspects of the focus area are identified. For example, if a focus area relates to a university-wide scheduling system, then event scheduling and system maintenance may be two different aspects of that system. The aspects identified at step 308 are typically narrower than the original focus area, and also may be defined in greater detail that the original focus area. Thus, "a university-wide scheduling system" defines a very broad focus area with very little detail about the software that is envisioned; "event scheduling" and "system maintenance" are each narrower in scope than "a university-wide scheduling system" but provide somewhat more detail about the nature of the software that is being designed. It should be appreciated that the decomposition of a focus area at step 308 represents an endeavor to partition, into independently-definable segments, the project of developing software that implements the business process specified in the focus area identified at step 302.

Each of the aspects identified at step 308 becomes a new focus area (step 310). Each of the new focus areas is "beneath" the original focus area within hierarchy 200 (shown in FIG. 2). It is convenient to refer to these new focus areas as "sub-focus areas," although it should be appreciated that the hierarchy of focus areas is recursive, and each sub-focus area is, in fact, a focus area in itself; like the original focus area, a sub-focus may be further decomposed into lower-level sub-focus areas and ultimately into business use cases. The participants for each newly-created focus area are identified. It should be noted that part of the process of creating a new focus area may involve interviewing people who will fill the roles of participants in those focus areas, or who have a stake in the requirements of the focus area. For example, at the top level focus area in a university-wide scheduling system, business planners 102 may be the effective interviewees in that they provide software developers 104 with the basic process that they need performed by the software. Once an "event scheduling" focus area has been derived from that top level focus area, it may become apparent that it is necessary to interview the people (e.g., professors, students, etc.) who will actually use the system. Likewise, a "system administration" focus area may require that the university employees who maintain computer be interviewed. An advantage of decomposing focus areas into use cases as opposed to building use cases directly is that focus areas may spur the collection of information from the relevant stakeholders in the project, rather than having the development of the software limited by the way in which software developers 104 perceive business planners 102's vision of a business process.

After the new focus areas are created, the process returns to step 304, where the roles of the participants in the new focus are identified. The process of decomposing focus areas level by level is repeated until the participants in the lowest-level focus areas each have only one role (i.e., the terminal condition in step 312) or one of the other conditions listed above is met.

Information Associated With a Focus Area

As described above, a focus area represents a business process at some level of abstraction. In creating and decomposing focus areas, it is preferable that the focus area be described in a specification which includes a collection of information organized according to a template; defining the focus area in this manner allows the software developer to organize the different types of information that need to be considered in the development of software. Table 1 shows a preferred example of the information that defines each focus area. It should be understood that, while it is preferable for each focus area to specify all of the following items, any subset or combination of these items (or additional items) may be used to define a focus area without departing from the spirit and scope of the invention.

TABLE 1

Focus Area Specification Attributes

| | |
|---|---|
| Focus Area Name: | A meaningful text name (present tense imperative verb form) |
| ID: | A unique numeric or alphanumeric identifier |
| Project: | The name of this project |
| Phase: | The appropriate OO development phase (either Initiation or Foundation) in which the focus area specification is developed |
| Release: | The software release in which the functions of this focus area will be available |
| Increment: | The software increment within a phase where the functions of this focus area will be available |
| Parent Focus Area Name: | A meaningful text name (present tense imperative verb form) of the parent focus area |
| Parent ID: | A unique numeric or alphanumeric identifier associated with the parent focus area |
| Description: | The purpose of this focus area. A good detailed description will help determine the soundness of the focus area and identify its external interfaces. |
| Participants: | The individuals or organizations taking part in the objectives associated with this focus area |
| Priority: | The importance of this focus area relative to other focus areas for successfully completing this project. You should set priorities at a level within the focus area decomposition graph that has meaning to project management. Once you have assigned the priority, all contained focus areas will have the same relative priority, possibly augmented by some point value. For focus areas that have no priority, specify None, meaning you have not assigned a priority to this focus area or any of its children. |

TABLE 1-continued

Focus Area Specification Attributes

| | |
|---|---|
| | If you set a priority for any of the children of a parent focus area independently of the parent, use the phrase "Not prioritized at this Abstraction Level" in this field. |
| Owner: | The person responsible for this focus area. It does not need to be the writer of the focus area specification. |
| Review Date: | The date a responsible individual (possibly the customer) reviewed or will review this focus area |
| Quality Grade: | The rating the review team assigned to this focus area specification. The team must assign a group grade from 1 to 10 to each reviewed focus area specification, where 1 means poor and 10 means the reviewers probably could do no better. |
| Sign-off: | The name of the reviewer(s) responsible for reviewing this focus area specification |
| Phone: | The telephone number of the reviewer |
| Email: | The email address of the reviewer |
| Comments: | A description of why the reviewer gave the quality grade to this focus area specification |
| Revision History: | The change log for this specification, requiring a new entry whenever a substantive change occurs. Preferably, this log includes: the date of the change, the name(s) of the contributor(s) to the change, text explaining the contents of this change and the reason(s) it was made, and a version number. |
| Reference Sources: | The people (e.g., domain experts) who provided the business information in this focus area specification |
| References: | Any published source material that provides the business information in this focus area specification |
| Business Background Inf.: | Any business issues, justifications of the requirements in this focus area, market factors, or other information that might be necessary to understand in a broader business context the requirements captured in this focus area |
| Assumptions: | Any relevant business events expected to precede the execution of this focus area. Include context information, implicit conditions, generalizations, simplifications, etc. that affect the scope of this focus area. These assumptions should pertain to the pursuit of the business goal identified in this focus area. |
| Limitations: | Any constraints on the execution or results of this focus area. A limitation may be the result of applying a business rule. Other limitations are actions this focus area will not take for whatever reason, even though this might seem to be a possible place for those actions. |
| Preconditions: | A list of all circumstances that must be true to generate a valid and appropriate request to execute this focus area |
| Postconditions: | A list of all circumstances (conditions or side effects) that may result from the execution of this focus area |
| Invariants: | A list of all conditions that must remain true throughout the execution of this focus area for its execution to be valid and appropriate |
| Metrics: | Measurements that may be captured to monitor any aspect of the execution of this focus area. (Note: This field does not include metrics about the development of this work product.) |
| Functional Requirements: | A reference to the portion(s) of the documentation containing functional requirements that this focus area fully or partially satisfies. This field depends on the existence of requirements documentation that logically precedes development of the focus area model. |
| Nonfunctional Requirements: | A reference to the portion(s) of the documentation containing nonfunctional requirements that this focus area fully or partially satisfies. This field depends on the existence of requirements documentation that logically precedes development of the focus area model. |
| Keywords: | A list of one or more words that describe the objects manipulated in this use case area. These words should enable a component designer to abstract from this specific project. Therefore, they should |

TABLE 1-continued

Focus Area Specification Attributes

| | |
|---|---|
| | represent a high level of abstraction and enable a search for reusable components. General business-type names may be appropriate. The person writing this work product should have a list of such terms. |
| Potential Reuse Opportunities: | Reuse opportunities made apparent by documenting this Project Requirements activity artifact |
| TBDs: | Issues discovered during review that need resolution and have no current solution. These may become requirements or may change the state of current requirements. |
| TBRs: | Comments made in this specification that need review and clarification |
| Notes: | General comments about this focus area, such as the hardness or softness of its associated requirements |

Information Associated with a Participant

As described above, a participant is an entity (person, machine, automaton, etc.) who participates in the process defined by a focus area. Like a focus area, a participant may be described in a specification which includes a collection of information in accordance with a template. Table 2 shows a preferred example of the information that defines or describes a participant. It should be understood that any subset or combination of these items (or additional items) may be used to define or describe a participant without departing from the spirit and scope of the invention.

TABLE 2

Participant Specification Attributes
General Information

| | |
|---|---|
| Participant Name: | A meaningful text name (a noun or noun phrase) |
| ID: | A sequence of one or more numeric or alphanumeric identifiers for this participant that relate it to its parent |
| Project: | The name of this project |
| Phase: | The appropriate OO development phase in which this participant specification was written |
| Release: | The software release in which the functions of this participant specification will be available |
| Increment: | The software increment within a phase where the functions of this participant specification will be available |
| Focus Areas: | The focus areas with which this participant is associated |
| Other Participants: | Other participants who engage in the focus areas that this participant engages in |
| Type: | The type of participant. Valid values are Human, Software, or Hardware. This field identifies application boundaries. |
| Owner: | The person responsible for this participant. It does not need to be the writer of the participant specification. |
| Review Date: | The date a responsible individual (possibly the customer) reviewed or will review this participant specification. |
| Quality Grade: | The rating the review team assigned to this participant specification. The team must assign a group grade from 1 to 10 to each reviewed participant specification, where 1 means poor and 10 means the reviewers probably could do no better. Some factors to consider when determining a quality grade are:<br>1. Lack of TBDs or TBRs when and where appropriate<br>2. Depth of understanding exhibited in descriptions, and appropriate use of TBDs and TBRs<br>3. Understandability: grammar, spelling, word usage<br>4. Inappropriate use of fuzzy words<br>5. Ease of reading, leading to new project insights |
| Sign-off: | The name of the reviewer(s) responsible for reviewing this participant specification |
| Phone: | The telephone number of the reviewer |
| Email: | The email address of the reviewer |

TABLE 2-continued

Participant Specification Attributes
General Information

| | |
|---|---|
| Comments: | A description of why the reviewer gave the quality grade to this participant specification |
| Revision History: | The change log for this specification, requiring a new entry whenever a substantive change occurs. The change log preferably includes: the date of the change, the name(s) of the contributor(s) to the change, text explaining the contents of the change and the reason(s) it was made, and a version number. |
| Reference Sources: | The people (e.g., domain experts) who provided the business information in this participant specification |
| References: | Any published source material that provides the business information in this participant specification |
| Assumptions: | Any participant-related assumptions that may be worth attention |
| Limitations: | A description of any relevant business events or states expected to affect the behavior of this participant. |
| Inflows and Outflows: | A descriptive name for each input this participant provides and each output the participant expects. You must expand each identified data element in a data dictionary explicitly showing its data attributes. |
| Expectation | Focus Area | Receives/Provides |
| [Data Dictionary Entry] | [Name + ID] | [Receives \| Provides] |
| Metrics: | Measurements that you may capture to monitor any aspect of the execution of this participant. (Note: This field does not include metrics about the development of this work product.) |
| Potential Reuse Opportunities: | Reuse opportunities made apparent by documenting this Project Requirements activity artifact |
| TBDs: | Issues discovered during review that need resolution and have no current solution. These may become requirements or may change the state of current requirements. |
| TBRs: | Comments made in this specification that need review and clarification |
| Notes: | General comments about this participant specification, such as the hardness or softness of its associated requirements |

Information Associated with a Use Case

As described above, a focus area whose participants each have only one role is analogous to a use case. Use cases may be defined and represented in a manner similar to focus areas—i.e., by creating a specification using a template to collect and organize information about the use case. Table 3 shows an preferred example of the information that defines a use case. It should be understood that any subset or combination of these items (or additional items) may be used to define a use case without departing from the spirit and scope of the invention.

TABLE 3

Use Case Specification Attributes
General Information

| | |
|---|---|
| Use Case Name: | A meaningful text name (present tense imperative verb form) |
| Use Case ID: | A unique numeric or alphanumeric identifier |
| Project: | The name of this project |
| Phase: | The appropriate OO development phase in which this use case specification was written |
| Release: | The software release in which the functions of this use case will be available |
| Increment: | The software increment within a phase where the functions of this use case will be available |
| Priority: | The measure of the criticalness of this use case for risk, usage, control, requirement complexity, unfamiliarity of design, etc. Valid values are Low, Medium, or High. To distinguish between urgency and importance, you may need an additional field to make the priority attributes more explicit. |

TABLE 3-continued

Use Case Specification Attributes
General Information

| | |
|---|---|
| Use Case Type: | The type of use case-either Concrete if you can instantiate the use case on its own or Abstract if it exists only as an extending or Included use case |
| Focus Area: | The text name of the enterprise-level or lower-level functional subdivision (focus area) that includes this use case |
| Increment: | The identifier of the life-cycle phase subdivision in which to complete this use case specification |
| Description: | A sentence or paragraph describing the intent of this use case in business terms |
| Owner: | The person responsible for this use case. It does not need to be the writer of the use case. |
| Review Date: | The date a responsible individual (possibly the customer) reviewed or will review this use case |
| Quality Grade: | The rating the review team assigned to this use case specification. The team must assign a group grade to each reviewed use case specification. Some factors to consider when determining a quality grade are:<br>1. Lack of TBDs or TBRs when and where appropriate<br>2. Depth of understanding exhibited in descriptions, and appropriate use of TBDs and TBRs<br>3. Understandability: grammar, spelling, word usage<br>4. Inappropriate use of fuzzy words<br>5. Ease of reading, leading to new project insights |
| Sign-off: | The name of the reviewer(s) responsible for reviewing this use case specification |
| Phone: | The telephone number of the reviewer |
| Email: | The email address of the reviewer |
| Comments: | A description of why the reviewer gave the quality grade to this use case specification |
| Revision History: | The change log for this specification, requiring a new entry whenever any substantive change occurs. Preferably, the change log includes: the date of the change, the name(s) of contributor(s) to the change, text explaining the contents of the change and the reason(s) it was made, and a version number. |
| Reference Sources: | The people (e.g., domain experts) who provided the business information in this use case specification |
| References: | Any published source material that provides the business information in this use case specification |
| Initiating Actors: | The supplier(s) of the initial stimulus that leads to executing this use case. (If there is not at least one actor, it will be assumed that this use case is Included by or extends one or more other use cases; the <<include>> or <<extend>> relationship will be modeled in the use case diagram and documented in the using or extending use case's specification. If there is more than one actor, actor inheritance may be used to simplify the use case diagram.) |
| Other Participating Actors: | Any actors, other than initiators of this use case, that this use case stimulates |
| Use Cases Included: | The names of any use cases that this use case always executes while accomplishing the defined purpose of this use case |
| Use Cases Extended: | The names of any use cases whose functions are expanded under certain conditions when this use case executes. You describe the conditions that determine whether or not this use case is executed in this (the extending use case's) specification. |
| Business Background Inf.: | Any business issues, justifications of the requirements in this use case, market factors, or other information that might be necessary to understand in a broader business context the requirements captured in this use case |
| Assumptions: | Any relevant business events expected to precede the execution of this use case, context information, implicit conditions, generalizations, simplifications, etc. that affect the scope of this use case |
| Limitations: | Any constraints on the execution or results of this use case. A limitation may be the result of applying a business rule. |
| Preconditions: | A list of all circumstances that must be true to generate a valid and appropriate request to execute this use case |
| Invariants: | A list of all conditions that must remain true throughout the execution of this use case for its execution to be valid and appropriate |
| Postconditions: | A list of all circumstances (conditions or side effects) that may result from the execution of this use case |
| Metrics: | Measurements that may be captured to monitor any aspect of the execution of this use case. (Note: This field does not include metrics about the development of this work product.) |
| Requirements Satisfied: | A reference to the portion(s) of the documentation containing requirements that this use case fully or partially satisfies. This field depends on the existence of functional and nonfunctional requirements documentation that logically precedes development of the use case model. |
| Basic Course of Action: | The "happy path"—the main path of execution for this use case |
| Basic Course Postconditions: | The state of the system as a result of executing this use case's happy path |
| Alternative Course of Action: | The course taken as a result of some system state change. (Note: No looping is allowed.) |
| Alternative Course Postconditions: | The state of the system as a result of executing this use case's alternative path. Make one entry for each alternative. |
| Potential Reuse Opportunities: | Reuse opportunities made apparent by documenting this Project Requirements activity artifact |
| TBDs: | Issues discovered during review that need resolution and have no current solution. These may become requirements or may change the state of current requirements. |
| TBRs: | Comments made in this specification that need review and clarification |
| Notes: | General comments about this specification, such as the hardness or softness of its associated requirements |

Information Associated with an Actor

An "actor" is a construct of UML, which is equivalent to a participant who has only one role. Thus, where a focus area has been sufficiently decomposed to constitute a use case, the participants in such a use case may be labeled "actors." Actors, like the participants in higher-level focus areas, may be represented as a specification that includes information organized in accordance with a template. Table 4 shows a preferred example of the information that defines an actor. It should be understood that any subset or combination of these items (or additional items) may be used to describe an actor without departing from the spirit and scope of the invention.

TABLE 4

Actor Specification Attributes
General Information

| | |
|---|---|
| Actor Name: | A meaningful text name (a noun or noun phrase) |
| ID: | A sequence of one or more numeric or alphanumeric identifiers for this actor that relate it to its parent |
| Project: | The name of this project |
| Phase: | The appropriate OO development phase in which this actor specification was produced |
| Release: | The software release in which the functions of this use case will be available |
| Increment: | The software increment within a phase where the functions of this use case will be available |
| Description: | The business purpose of this actor |
| Use Cases: | The use cases with which this actor is associated |
| Use Case Initiator: | A collection of tuples of the form [use case name: T/F], which identifies the given actor as either the initiating actor for this use case (T for true) or a responder for some other initiator (F for false |

TABLE 4-continued

Actor Specification Attributes
General Information

| | |
|---|---|
| Role-Playing Participants: | For each use case in which this actor participates, a comma-separated list of fellow participating actors. Use the form [use case name: actor1, actor2, . . .]. |
| Type: | The type of actor this is. Valid values are Human, Software, or Hardware. This field identifies application boundaries. |
| Application External: | An indication that the actor is outside this application (i.e., not built, written, etc. specifically for this application) |
| Owner: | The person responsible for this actor. It does not need to be the writer of the actor specification. |
| Review Date: | The date a responsible individual (possibly the customer) reviewed or will review this actor specification |
| Quality Grade: | The rating the review team assigned to this actor specification. The team must assign a group grade to each reviewed actor specification. |
| Sign-off: | The name of the reviewer(s) responsible for reviewing this actor specification |
| Phone: | The telephone number of the reviewer |
| Email: | The email address of the reviewer |
| Comments: | A description of why the reviewer gave the quality grade to this actor specification. |
| Revision History: | The change log for this specification, requiring a new entry whenever a substantive change occurs. Preferably, the change log includes: the date of the change, the name(s) of contributor(s) to the change, text explaining the contents of the change and the reason(s) it was made, and a version number. |
| Reference Sources: | The people (e.g., domain experts) who provided the business information in this actor specification |
| References: | Any published source material that provides the business information in this actor specification |
| Actor Derived From: | The name of the parent who will act as a stand-in for this actor in some use cases |
| Assumptions: | Any actor-related assumptions that may be worth attention |
| Limitations: | Any relevant business events or states that are expected to affect the behavior of this actor |
| Scripts: | A collection of one or more navigation diagrams, each describing a particular usage scenario involving this actor and the system. Use the form [storyboard1, storyboard2, . . .]. If necessary, rather than repeating these scripts for every actor who uses them, it may be better to place them in a parent actor specification from which the others inherit their scripts. |
| Inflows and Outflows: | A descriptive name for each input this actor provides and each output the actor expects. You must expand each identified data element in a data dictionary explicitly showing its data attributes. |
| Expectation [Data Dictionary Entry] | Use Case [Name + ID] Receives/Provides [Receives \| Provides] |
| Metrics: | Measurements that may be captured to monitor any aspect of the execution of this actor. (Note: This field does not include metrics related to the development of this work product.) |
| Potential Reuse Opportunities: | Reuse opportunities made apparent by documenting this Project Requirements activity artifact |
| TBDs: | Issues discovered during review that need resolution and have no current solution. These may become requirements or may change the state of current requirements. |
| TBRs: | Comments made in this specification that need review and clarification |
| Notes: | General comments about this specification, such as the hardness or softness of its associated requirements |

Software Design Example Using Focus Areas

FIGS. 4–7 depict a detailed example of the use of focus areas to develop a set of UML use cases from a business process. The specifications for selected focus areas, participants, and use cases in the example are set forth in detail in the Appendix below. The discussion of FIGS. 4–7 will refer to the Appendix for a detailed description of these components, where appropriate. The example of FIGS. 4–7 relates to the development of a scheduling system for "CAMPER University."

Figure 4:
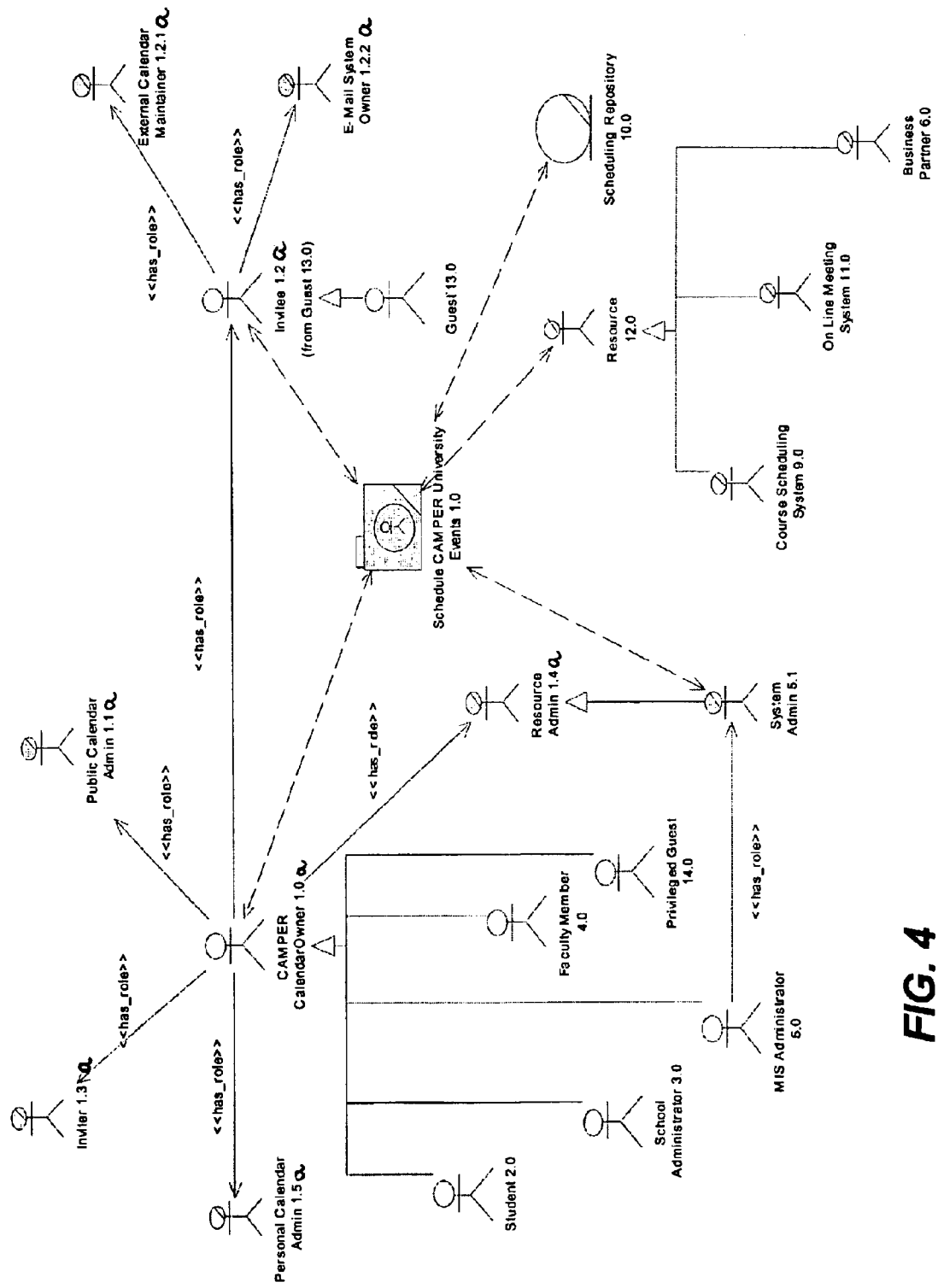
FIG. 4 is a block diagram showing a zero-level focus area and its participants in the form of a Unified Modeling Language (UML) diagram.

FIG. 4 depicts a top-level (or "zero level") focus area 1.0, and the participants who interact with the focus area. FIG. 4 is generally in the form of a UML diagram, except that it includes focus areas and participants, which are not conventionally part of UML.

The zero level focus area shown in FIG. 4 is named "schedule CAMPER university events." Focus area 1.0 has a specification (see Appendix below), which explains that focus area 1.0 is directed to the problem that CAMPER University is looking to develop a system that can be used to schedule meetings and school events. The specification includes the fields for a focus area specification, which are shown and described in Table 1 above.

One of the fields included in the specification of focus area 1.0 is a list of participants for focus area 1.0. The specification for focus area 1.0 lists as participants: student 2.0, school administrator 3.0, faculty member 4.0, MIS administrator 5.0, privileged guest 14.0, scheduling repository 10.0, business partner 6.0, guest 13.0, course scheduling system 9.0, and on line meeting system 11.0. As can be appreciated from this example, participants need not be human users of the system; in this example, scheduling repository 10.0, course scheduling system 9.0, and on line meeting system 11.0 are non-human participants in focus area 1.0, in the sense that they are identifiable entities that will interact with the process defined by focus area 1.0.

In addition to the participants listed in the specification, other entities shown in FIG. 4 are based on the listed participants. CAMPER calendar owner 1.0a is a participant who represents a composite of participants 2.0, 3.0, 4.0, 5.0, and 14.0, who have at least some roles in common with respect to focus area 1.0. CAMPER calendar owner 1.0a has the plural roles of public calendar administrator 1.1a, invitee 1.2a, inviter 1.3a, resource administrator 1.4a, and personal calendar administrator 1.5a. (When focus areas and participants are used in a real-world development project, a focus area and a participant may be assigned the same number; for the purpose of the drawings herein, the number associated with a participant is followed by an "a" where such number conflicts with a focus area having the same number.) Invitee 1.2a is a participant, which has the roles of external calendar maintainer 1.2.1a and e-mail system owner 1.2.2a. Guest 13.0 is another participant, and guest 13.0 may be an invitee 1.2a. Resource 12.0 is a composite of actors 9.0, 11.0, and 6.0. System administrator 5.1 is one of the roles of MIS administrator.

In the model shown in FIG. 4, CAMPER calendar owner 1.0a, system administrator 5.1, invitee 1.2a, and resource 12.0 are the participants/actors who interact directly with focus area 1.0. The specification for CAMPER calendar owner 1.0a is listed in the Appendix below. As shown in the Appendix, the specification lists a set of roles played by CAMPER calendar owner 1.0a, and that list includes participants 1.1a, 1.3a, 1.4a, 1.5a, and 13.0. This list of roles is created by decomposing CAMPER calendar owner 1.0a. That is, software developers 104 decompose CAMPER calendar owner 1.0a by identifying the separate role played by CAMPER calendar owner 1.0a, and the identified roles are listed on the specification of CAMPER calendar owner 1.0a. The identified roles may then be used as participants in lower-level focus areas that are directed at more specific aspects of the "schedule CAMPER university events" described in focus area 1.0.

Figure 5:
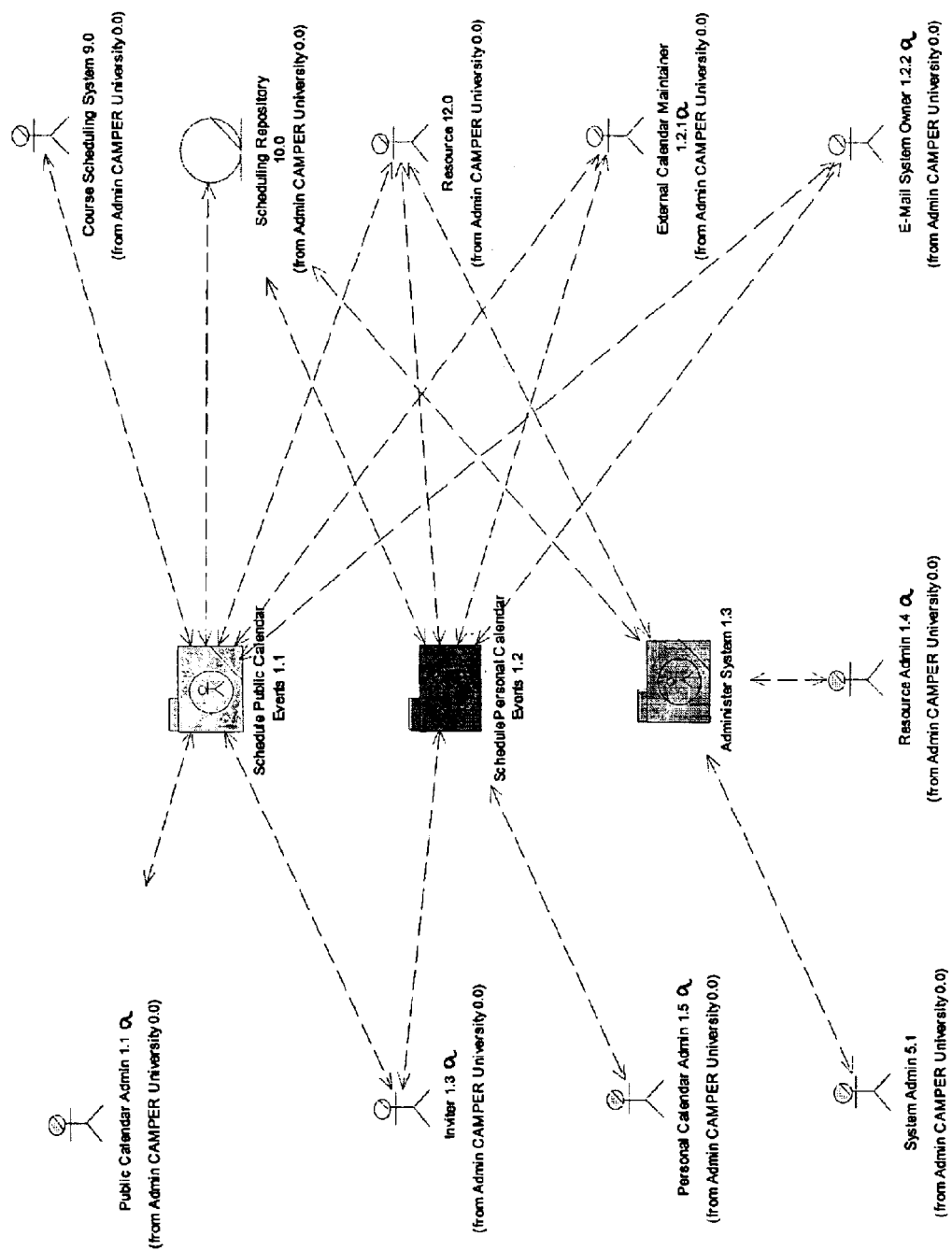
FIG. 5 is a block diagram showing, in the form of a UML diagram, a first-level set of focus areas and participants decomposed from the zero-level focus area shown in FIG. 4.

FIG. 5 shows a set of first-level focus areas 1.1, 1.2, and 1.3 that are based on zero-level focus area 1.0. Focus areas 1.1, 1.2, and 1.3 represent the decomposition of zero-level focus area 1.0. With reference to the hierarchy shown in FIG. 2, it will be understood that zero-level focus area 1.0 is at the top level of hierarchy 200, and first-level focus areas are one level down within hierarchy 200.

Focus areas 1.1, 1.2, and 1.3 represent different aspects of the "scheduler CAMPER university events" focus area 1.0. For example, focus area 1.1 is directed to the scheduling of public calendar events. Focus area 1.2 is directed to the scheduling of personal calendar events; a specification of focus area 1.2 is shown below in the Appendix. Focus area 1.3 is directed to system administration. It can be appreciated that each of focus areas 1.1, 1.2, and 1.3 is directed to an aspect of the overarching business process represented by focus area 1.0.

The participants in the various first level focus areas shown in FIG. 5 include some of the decomposed participant roles from the zero level focus area shown in FIG. 4. Thus, public calendar administrator 1.1a is a participant in the "schedule public calendar events" focus area 1.1. Inviter 1.3a is a participant in the "schedule public calendar events" focus area 1.1, as well as in the "schedule personal calendar events" focus area 1.2. Personal calendar administrator 1.5a is a participant in the "schedule personal calendar events" focus area 1.2; a specification for personal calendar administrator 1.5a is shown below in the Appendix. System administrator 5.1 and resource administrator 1.4a are participants in the "administer system" focus area 1.3. Other participants in the first level focus area shown in FIG. 5 are course scheduling system 9.0, scheduling repository 10.0, resource 12.0, external calendar maintainer 1.2.1a, and e-mail system owner 1.2.2a. It will be observed, again, that some of these participants (e.g., scheduling repository 10.0) are non-human participants. Moreover, in the example of FIG. 5 it should be observed that each participant is shown on the diagram of zero-level focus area 1.0 (FIG. 4), although it is not necessary that every participant in a lower-level sub-focus area be shown on a diagram of a higher-level focus area from which the sub-focus area is derived. At any level of focus areas, the participants may be further decomposed into roles, as may be appropriate for the nature of the software being developed.

Figure 6:
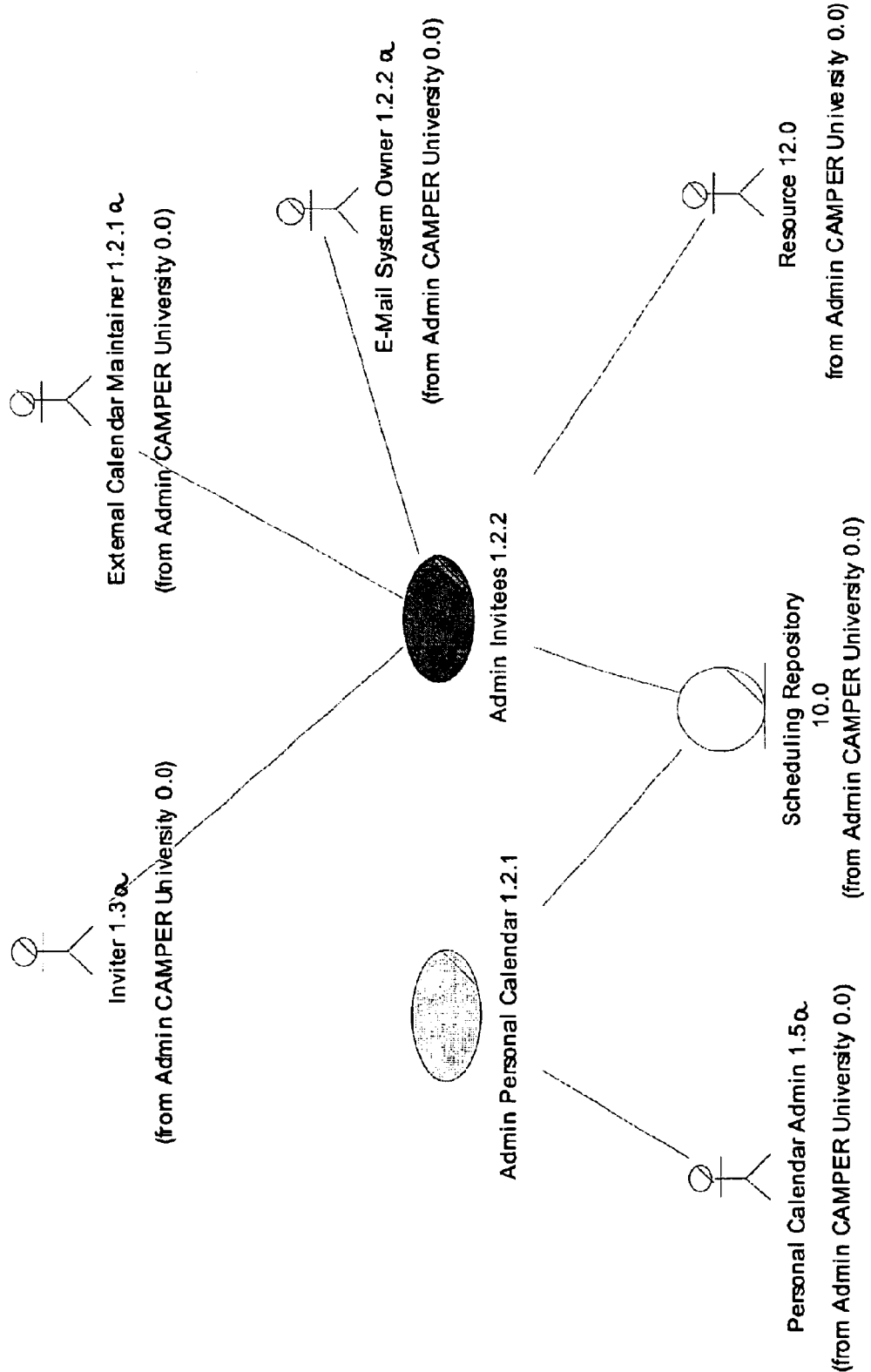
FIG. 6 is a block diagram showing, in the form of a UML diagram, a second-level set of focus areas/business use cases and participants/actors decomposed from the first-level focus areas shown in FIG. 5.

FIG. 6 shows a further decomposition of the "schedule personal calendar events" focus area 1.2 into two second level focus areas 1.2.1 and 1.2.2. (A specification for focus area 1.2.1 is shown below in the Appendix.) Focus areas 1.2.1 and 1.2.2 are lower in hierarchy 200 than the first level focus areas shown in FIG. 5. Focus areas 1.2.1 and 1.2.2 are derived from focus area 1.2 in the sense that each of focus areas 1.2.1 and 1.2. 1 represents an separate aspect of the "schedule personal calendar events" business process (which, as will be recalled, was itself an aspect of the "schedule CAMPER university events" focus area 1.0 shown in FIG. 4). Focus areas 1.2.1 and 1.2.2 are UML business use cases, because focus areas 1.2.1 and 1.2.2 have been sufficiently decomposed that each participant in these focus areas has only a single role. Since each participant in focus areas/business use cases 1.2.1 and 1.2.2 has only one role, each of these participants is a UML "actor."

As shown in FIG. 6, personal calendar administrator 1.5a and scheduling repository 10.0 participate in focus area/business use case 1.2.1 ("admin personal calendar"). Inviter 1.3a, external calendar maintainer 1.2.1a, e-mail system owner 1.2.2a, and resource 12.0 participate in focus area 1.2.2 ("admin invitees").

Figure 7:
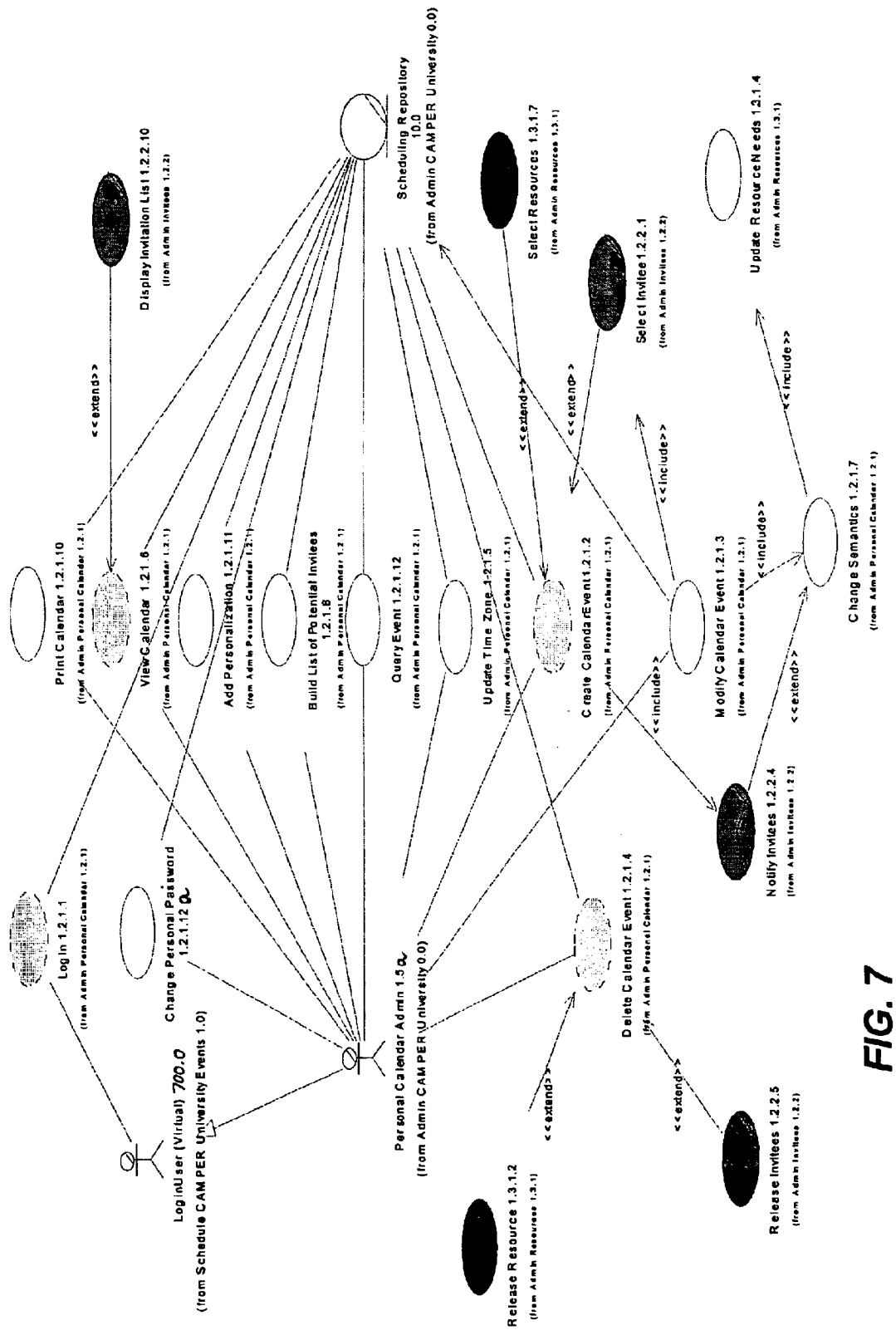
FIG. 7 is a UML diagram of use cases and actors decomposed from the second level focus areas shown in FIG. 6.

FIG. 7 shows a further decomposition of focus area/business use case 1.2.1. Focus area/business use case 1.2.1 is decomposed into various UML system use cases. In this example, the use cases based on focus area/business use case 1.2.1 are: login use case 1.2.1.1, create calendar event use case 1.2.1.2, modify calendar event use case 1.2.1.3, delete calendar event use case 1.2.1.4, update time zone use case 1.2.1.5, view calendar use case 1.2.1.6, change semantics use case 1.2.1.7, build list of personal invitees use case 1.2.1.8, print calendar use case 1.2.1.10, add personalization use case 1.2.1.11, query event use case 1.2.1.12, and change personal password use case 1.2.1.12a. FIG. 7 also shows use cases derived from focus areas other than focus area 1.2.1, which are included within or otherwise related to the use cases derived from focus area 1.2.1. These include a release resource use case 1.3.1.2, a release invitees use case 1.2.2.5, a notify invitees use case 1.2.2.4, a select invitee use case 1.2.2.1, and update resource needs use case 1.3.1.4, a select resources use case 1.3.1.7, and a display invitation list use case 1.2.2.10. The relationship between these additional use cases and the use cases derived from focus area 1.2.1 is shown FIG. 7.

The participants in the various use cases shown in FIG. 7 are a login user 700.0, personal calendar administrator 1.5a, and scheduling repository 10.0. Each of these participants is an actor because each of the depicted participants has only one role.

Significantly, the set of use cases and participants shown in FIG. 7 is at the UML use case level. These use cases and participants can be modeled using conventional UML modeling tools such as the RATIONAL ROSE visual modeling tool. As is known in the art of software development, the creation of effective use cases supports the rapid and efficient development of software, and also aids in distributing software development tasks across a large software development team. Thus, the specification of a business process as a zero-level focus area 1.0, and its subsequent level-by-level decomposition, is used to convert a high-level business process into a formal model of the software that complies with a recognized standard format (i.e., UML).

Propagation of Fields

As shown in Tables 1–4 and in the Appendix, focus areas, participants, use cases and actors can be specified according to a template having various fields. One advantage to using a template with such fields is that doing so allows a software development team to organize its analysis of a business process into various areas. For example, rather than thinking about the software in general terms, the development team is encouraged to separate issues into such areas as the requirements for the software, the participants in the business process, goals, assumptions, etc.

Another advantage to using a template having various fields is that the particular fields defined in the template can be chosen to reflect attributes of a focus area that should "propagate" to the next focus area. For example, a "requirement" that applies to a top level (or "zero level") focus area should apply to a sub-focus area that represents some aspect of top level focus area. At a minimum, a software development team should be encouraged to evaluate the top level requirement to determine how or if it applies to a lower level focus area.

In order to support effective decomposition of focus areas, certain fields that must be applied to a sub-focus area, or whose application to a sub-focus area should be considered, are "propagated" from a given focus area to any lower-level focus area that is based on the given focus area. Table 5 shows which fields are propagated from one focus area to the next, in a preferred embodiment.

TABLE 5

| Parent Focus Area/Business Area/Business Use Case | Child Focus Area | Child Implementation Use Case |
|---|---|---|
| 1. Project | Project | Project |
| 2. Phase | Phase | |
| 3. Release | Release | Release |
| 4. Description | | |
| 5. Participants | | |
| 6. Priority | Priority | Priority |
| 7. Owner | Owner | Owner |
| 8. Review Date | | |
| 9. Quality Grade | | |
| 10. Sign-off | | |
| 11. Phone | | |
| 12. Email | | |
| 13. Comments | | |
| 14. Reference Sources | Reference Sources | Reference Sources |
| 15. References | References | References |
| 16. Business Background | Business Background | Business Background |
| 17. Assumptions | Assumptions (possibly not all) | Assumptions (possibly not all) |
| 18. Limitations | | |
| 19. Preconditions | | |
| 20. Post Conditions | | |
| 21. Invariants | | |
| 22. Metrics | | |
| 23. Functional Requirements | Description (Based on Req. ID) | Description (Based on Req. ID) |
| 24. Nonfunctional Requirements | | |
| 25. Business Goals Addressed | Business Goals Addressed (possibly sub-goal) | |
| 26. Potential Reuse Opportunities | | |
| 27. TBRs | | |
| 28. TBDs | | |
| 29. Notes | | |

With reference to Table 5, as one example, the "functional requirements" for a given focus area are propagated to a lower-level focus area based on the given focus area. Thus, when software developers 104 write the specification for the lower-level focus areas, they have the higher-level functional requirements as a "starting point" for considering the lower-level functional requirements. In one embodiment, a tool may be created (e.g., a set of macros for an existing program, such as a word processor) that creates a "skeleton" of a specification for a lower-level focus area by propagating the appropriate fields from a higher-level focus area. Software developers 104 may, in fact, modify the propagated information, but the provision of such information as a starting point helps to ensure that important information (e.g., functional requirements) is not lost in the development process as focus areas are decomposed.

Similarly, Table 6 shows, in a preferred embodiment, which fields are propagated from a higher-level participant to a business actor created by decomposing such higher-level participant.

TABLE 6

| Participant Specification | Contained Business Actors |
|---|---|
| 1. Project | Project |
| 2. Phase | Phase |
| 3. Release | Release |

It should be understood that propagation of requirements may, in some cases, be bidirectional. Thus, if information is captured at a lower-level focus area that indicates that a functional requirement applies to such lower-level focus area, that requirement may be propagated up to higher-level focus areas so that software developers 104 can consider how the requirement applies to higher levels.

It is noted that the foregoing examples have been provided merely for the purpose of explanation and are in no way to be construed as limiting of the present invention. While the invention has been described with reference to various embodiments, it is understood that the words which have been used herein are words of description and illustration, rather than words of limitations. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

APPENDIX

Specification for Focus Area 1.0

Focus Area Name: Schedule CAMPER University Events   ID: 1.0

Project: C# Book Effort   Release: 1.0

Phase: Requirements/Initiation   Increment: 1.0

BB006/USYS-0099 - 36 - PATENT

Parent Focus Area: Admin CAMPER University  Parent ID: 0.0

Description:

CAMPER university is looking to develop a scheduling system, which can be used to schedule meetings and school events. Meetings may be called by its teaching staff, administrators and by its student body. Some individuals not directly part of the CAMPER community may also be given permission to use the newly developed system. These Privileged Guests are given their own calendar and are in all ways treated like any other calendar owner. The owner of the university for example might be considered a privileged guest.

A calendar owner must be able to manipulate her personal calendar to the extent that she can add and delete invitees, acquire needed meeting resources, and select the start, date, time and duration of the event. The system must be able to query the calendars of other calendar owners within the system so as to negotiate a schedule time.

Participants: Student, School Administrator, Faculty Member, and MIS Administrator, Privileged Guest, Scheduling Repository, Business Partner, Guest, Course Scheduling System, On Line Meeting System

| Priority: | High |
|---|---|
| Owner: | Phil Rossomando |
| Review Date: | Friday, February 09, 2001 |
| Quality Grade: | (Note#1) |
| Sign-off: | English, Art; Claget, Michel |
| Phone: | 111-222-3333  Email: xxx@unisys.com |
| Comments: | (Note#1) |

Revision History:

| Date | Authors | Description | Version |
|---|---|---|---|
| 02/07/2000 | Phil Rossomando | Created first cut at this focus area specification. | 1.0 |

Reference Sources:

David Learner CIO of CAMPER University

BB006/USYS-0099 - 37 - PATENT

References:

RFP Letter from CAMPER University dated: January 12, 2001.

Business Background Inf.:

CAMPER University, because of its phenomenal growth, has determined that its globally distributed staff of educators and administrators are unable to maintain the paper, email and telephone based meeting and event scheduling system currently in place today. Instead, they wish to provide an Internet based system, which is more in line with distance education context.

The school is a Click-and-mortar university with headquarters in Washington DC but globally dispersed with staff and students located in Japan, Great Britain, Finland, Russia, France, the USA and several other countries worldwide. Thus in order to help unify this widely distributed community CAMPER executives feel an Internet-based solution would be most effective. CAMPER desires to provide a small school environment despite its global distribution and virtual presence.

Assumptions:

1. All individuals involved in meetings as inviters or invitees have access to a PC with WEB capabilities (i.e., IEx or Netscape Navigator).
2. When implemented, the system will increase access between members of the CAMPER community by a factor of 10.

Limitations:

1. Within release 1.0 of the CAMPER meeting system, only the private access capability will be supported along with the infrastructure necessary to make this possible.

Preconditions:

1. Meeting scheduling was performed only through telephone, email and snail mail.

Post conditions:

1. The majority of meeting scheduling will be done using the new Internet facility.

Invariants:

1. Ability to schedule meetings will at no time be jeopardized.

Metrics:

TBD#1

Functional Requirements:

Requirement Name: Support Public Calendar Admin   Requirement ID: 1.1
Description:

The system shall be able to schedule public events (i.e., events open to the general CAMPER community) wherein a CAMPER event scheduler can record events of significance to the CAMPER community and potential attendees can sign up for the event. This capability shall be password protected in all situations. This system will allow event cancellation and to the extent possible will support automatic notification of potential attendees of that cancellation. Also, any event changes deemed of importance to potential attendees will be automatically announced to those signed up attendees to the extent technically possible. The inviter will be provided with a capability to acquire resources needed for the meeting through the scheduling system itself.

Requirement Name: Support Personal Calendar Admin   Requirement ID: 1.2
Description:

The system shall provide a capability similar to that described above to authorize CAMPER community members for the purpose of scheduling private/personal meeting and events. This capability will however only support inviter assignment of meeting attendees. In addition, it will support to the extent possible an automatic negotiation of schedule between that desired by the inviter and that announced through the invitees posted schedule.

Invitees will be given the option to accept or turn down an invitation and to add/attach a small not e to the response. In addition, the inviter will be provided with a capability to acquire resources needed for the meeting through the scheduling system itself.

Requirement Name: Provide For System Administration Requirement ID: 1.3
Description:

The system shall allow CAMPER support staff to add and remove individuals who are allowed to use the scheduling system. General database administration will be supported through an interface specific to this activity. The system shall allow identified administrative staff to define what resources in support of meeting inviters in support of her meeting may schedule.

Potential inviters shall be automatically made aware of any new resources made available to her for potential event usage. As mentioned earlier, all such access will be password protected and individuals will be restricted as to what functionality they have through the use of access levels.

The system shall allow inviters to select a resource for a given event and negotiate the availability of that resource for assignment for use within the event. If not available, the system shall so notify the requester. Similarly, if for some reason that resource should become unavailable, the inviter will be so informed and allowed to perform those support actions deemed necessary. These could include negotiating for other substitute resources.

Nonfunctional Requirements:

Requirement Name: Behavioral Constraints  Requirement ID: 1.0
Description:

1. The system shall inform the inviter of any event, which will prevent or affect the scheduling of an event.
2. The system shall be able to assign a priority/urgency level to meetings/events.
3. The system shall account for differences in time zone between that of the inviter and the invitee.
4. The system shall be available on a 7 x 24 bases. Maintenance must be transparent to the user community.

Keywords:

Scheduling system, meeting scheduling, scheduling

Business Goals Addressed:

Goal Name: Most Connected In the World  Goal Number: 1.0
Description:

The CAMPER community shall be the most connected distance education community in the world. All members of the community will through the capabilities provided herein support CAMPER in its goal to provide a small campus environment to a community distributed around the world.

Potential Reuse Opportunities:

1. The system under development could be used to schedule any schedulable entity, not just meetings.

TBRs:

BB006/USYS-0099 - 40 - PATENT

1. NONE

TBDs:

1. Metrics must be collected which will allow the CAMPER support staff to monitor the efficiency and reliability of the developed system however, as of the time of this writing, such metrics have not been identified.

Notes:

1. To be filled in by the individual reviewers of this document.

Specification for Participant 1.0a

Participant Name: CAMPER Calendar Owner   ID: 1.0

Project: C# Book Effort   Release: 1.0

Phase: Initiation   Increment: 1.0

Description:

As the name implies, a CAMPER Calendar Owner is the owner of one or more calendars within the CAMPER Scheduling system. The calendars owned may be either private (i.e., dedicated only to the CCO and for use only to schedule personal calendar events) or public. Public calendars are for scheduling and identifying events of interest to the general CAMPER community. Such events might include holidays observed, tuition due dates, and general on-line events, which can be attended by remote participants. Even events of local interest may be identified on the public calendar by an authorized CCO.

The roles of a CCO may be played by any of the following authorized individuals:

1. Student 2.0 (I.e., any of the many of CAMPER registered students)
2. School Administrator 3.0 (I.e., any CAMPER administrator and content providers located anywhere in the world but primarily focused in Washington D.C. and Minneapolis Minnesota)
3. Faculty Member 4.0 (i.e., any CAMPER faculty member/Instructor located anywhere in the world.)
4. MIS Administrator 5.0 (i.e., any of the CAMPER staff given special responsibility for the administration of the entire CAMPER University computer network.)
5. Privileged Guest 14.0 (i.e., those individuals identified by the university as special/privileged. These individuals consist of such

BB006/USYS-0099 - 41 - PATENT persons as retired facility, the owners of CAMPER University, and others who may be granted such privileges.

Focus Areas:

1. Schedule CAMPER University Events     ID: 1.0

Other Participants:

1. Guest     ID: 12.0
2. Scheduling Repository     ID: 10.0
3. Resource     ID: 12.0
4. System Admin     ID: 5.1

Type: Human

Owner: Phil Rossomando

Review Date: Monday, March 05, 2001

Quality Grade: (Note#1)

Sign-off: English, Art; Clagett, Michel

Phone: 111-222-3333     Email: xxx@unisys.com

Comments: (Note#1)

Revision History:

| Date | Authors | Description | Version |
|---|---|---|---|
| 3/02/2001 | Phil Rossomando | Created first cut at this Participant Specification | 1.0 |

Reference Sources:

David Learner CIO of CAMPER University

References:

RFP Letter from CAMPER University dated: January 12, 2001.

BB006/USYS-0099 - 42 - PATENT

Assumptions:

1. Access the CAMPER calendar facility by the CCO will be via HTTP and TCP/IP connections.
2. The CCO must be a registered CAMPER individual of the type itemized above. Only the system administrator can register such individuals as valid CAMPER Scheduling System users.
3. A CCO may be responsible for multiple public calendars within the Camper Scheduling system but will only have a single private calendar.

Limitations:

1. Once authorized, a CCO will only be granted access to the CAMPER Scheduling facility after entering a CCO defined password. Initial access will be provided via a login id and default password provided by the System Administrator. Said administrator via an email message sent to the new CCO will provide this information.
2. Passwords will expire within a three month (TBR #1) interval at which time the CCO will be prompted for a new password. Access will be denied until a new password is provided.

Roles Played:

1. Public Calendar Administrator ID: 1.1
2. Guest ID: 12.0
3. Inviter ID: 1.3
4. Resource Administrator ID: 1.4
5. Personal Calendar Admin ID: 1.5

Inflows and Outflows:

| Expectation | Focus Area | Receives/Provides |
|---|---|---|
| 1. Password Packet | Schedule CAMPER University Events 1.0 | Provides |
| 2. Event Definition Packet | | Provides |
| 3. Guest Identification Packet | | Provides |
| 4. Resource Needs Packet | | Provides |

| | | |
|---|---|---|
| 5. Resource Availability Packet | | Receives |
| 6. Event Notification Packet | | Receives |
| 7. Password Expiration Notice | | Receives |
| 8. New/Revised Password Request Packet | | Provides |
| 9. Intent To Attend Event Packet | | Provides |
| 10. Login Packet | | Provides |

Metrics:

1. (TBD #1)

Potential Reuse Opportunities:

1. N/A (TBD #2)

TBRs:

1. Is this appropriate? Is the interval too long, or too short?

TBDs:

1. Any quality metrics to me applied to the PCA?
2. Is this a true observation here?

Notes:

1. To be provided by the reviewers.

Specification for Focus Area 1.2

Focus Area Name: Schedule Personal Calendar Events  ID: 1.2

Project: C# Book Effort  Release: 1.0

Phase: Requirements/Initiation  Increment: 1.0

Parent Focus Area: Schedule CAMPER University Events  Parent ID: 1.0

BB006/USYS-0099 - 44 - PATENT

Description:

This focus area allows the calendar owner to manipulate her personal calendar to the extent that she can add and delete invitees, acquire needed meeting resources, and select the start, date, time and duration of the event. The system must be able to query the calendars of other calendar owners within the system so as to negotiate a schedule time.

Participants: Inviter, Personal Calendar Administrator, Scheduling Repository, Resource, and Invitee

Priority: High

Owner: Phil Rossomando

Review Date: Friday, February 09, 2001

Quality Grade: (Note#1)

Sign-off: English, Art; Claget, Michel

Phone: 111-222-3333  Email: xxx@unisys.com

Comments: Note1

Revision History:

| Date | Authors | Description | Version |
|---|---|---|---|
| 02/07/2000 | Phil Rossomando | Created first cut at this focus area specification. | 1.0 |

Reference Sources:

David Learner CIO of CAMPER University

References:

RFP Letter from CAMPER University dated: January 12, 2001.

Business Background Inf.:

CAMPER University, because of its phenomenal growth, has determined that its globally distributed staff of educators and administrators are unable to maintain the paper, email and telephone based meeting and event scheduling system currently in place today. Instead, they wish to provide an Internet based system, which is more in line with distance education context.

The school is a Click-and-mortar university with headquarters in Washington DC but globally dispersed with staff and students located in Japan, Great Britain, Finland, Russia, France, the USA and several other countries worldwide. Thus in order to help unify this widely distributed community CAMPER executives feel an Internet-based solution would be most affective. CAMPER desires to provide a small school environment despite its global distribution and virtual presence.

Assumptions:

1. All individuals involved in meetings as inviters or invitees have access to a PC with WEB capabilities (i.e., IEx or Netscape Navigator).
2. When implemented, the system will increase access between members of the CAMPER community by a factor of 10.

Limitations:

1. Within release 1.0 of the CAMPER meeting system, schedule negotiation between an invitee's and an inviter's scheduling systems will not be automatically performed.
2. Time zone correction will not be performed.
3. The creation of a personal list of potential invitees (i.e., an email directory) will not be provided.
4. Schedule modification will not be supported. Users wishing to change an event's attributes must delete that event and recreate it from scratch.

Preconditions:

1. Personal meeting scheduling was performed only through telephone, email and snail mail.

Post conditions:

1. The majority of personal meeting scheduling will be done using the new Internet facility.

Invariants:

1. Ability to schedule personal meetings will at no time be jeopardized.

Metrics:

(TBD#1)

BB006/USYS-0099 - 46 - PATENT

Functional Requirements:

Requirement Name: Support Physical Calendar Admin Requirement ID: 1.2.1
Description:

1. The system shall support personal calendar viewing by the calendar owner.
    a. The system shall display to the calendar owner any invitations she
       may have received since her last calendar viewing experience.
2. The system shall support the deletion of calendar events formally created by the calendar owner.
3. The system shall support the creation of calendar events.
4. The system shall require that the calendar owner present proof of ownership before allowing her to engage in any calendar related administrative activities.
5. The changing of a password by an owner shall be supported.

Requirement Name: Support Admin Of Invitees Requirement ID: 1.2.2
Description:

1. The system shall support the addition of a new invitee to an event's invitee list based on manual entry of usable invitee contact information.
2. The system shall negotiate/reconcile differences between an inviter's desired event schedule and the availability schedules of those invitee's within the CAMPER community and those individuals with whom the schedule system can negotiate schedules.
3. The system shall support the creation of personal event invitations.
4. The system shall automatically send invitations to invitees added to an inviter's event list.
5. The system supports the removal of invitees from an event's list of associated invitees.
    5.1 Invitees removed from an event list will be so notified.
    5.2 Any failure to notify an invitee shall be reported to the inviter.

Nonfunctional Requirements:

Requirement Name: Behavioral Constraints Requirement ID: 1.0
Description:

1. The system shall inform the inviter of any event, which will prevent or affect the scheduling of an event.

2. The system shall be able to assign a priority/urgency level to meetings/events.
3. The system shall be available on a 7 x 24 bases. Maintenance must be transparent to the user community.
4. The system shall schedule events in units of months, days, hours and half hours.

Keywords:

Scheduling system, meeting scheduling, scheduling, inviter, invitee, schedulable resource

Business Goals Addressed:

Goal Name: Most Connected In the World     Goal Number: 1.0
Description:

The CAMPER student, faculty, and administrative communities shall be the most connected distance education communities in the world. All members of these communities will, through the capabilities provided herein, support CAMPER in its goal to provide a small campus environment to an individual community members distributed around the world.

Potential Reuse Opportunities:

1. The system under development could be used to schedule any schedulable entity, not just meetings.

TBRs:

1. NONE

TBDs:

1. Metrics must be collected which will allow the CAMPER support staff to monitor the efficiency and reliability of the developed system however, as of the time of this writing, such metrics have not been identified.

Notes:

1. To be filled in by the individual reviewers of this document.

Specification of Actor 1.5a

Actor Name: Personal Calendar Administrator     ID: 1.5

| | | | | |
|---|---|---|---|---|
| BB006/USYS-0099 | | - 48 - | | PATENT |
| Project: | C# Book Effort | | Release: | 1.0 |
| Phase: | Architecture/Foundation | | Increment: | 1.0 |

Description:

This is one of two roles currently identified for the Private Calendar Owner 1.1, which in turn represents one of the four roles of the CAMPER Calendar Owner 1.0. In this role, either the:

1. School Administrator 2.0
2. Student 1.0
3. Faculty Member 4.0
4. MIS Administrator 3.0
5. Privileged Guest 14.0

Administers the basic functions of an on-line calendar system, excluding such things as inviting guests or acquiring resources needed for a scheduled event. As such, this role could be played by any actor without the wider access envisioned for the service to be provided by the CAMPER scheduling system.

Use Cases Initiator:

1. Admin Personal Calendar 1.2.1: T
2. Login 1.2.1.1: T,
3. Change Personal Password 1.2.1.12: T,
4. Print Calendar 1.2.1.10: T,
5. View Calendar 1.2.1.6: T,
6. Add Personalization 1.2.1.11: T,
7. Build List of Potential Invitees 1.2.1.8: T,
8. Query Event 1.2.1.12: T,
9. Update Time Zone 1.2.1.5: T,
10. Create Calendar Event 1.2.1.2: T,
11. Modify Calendar Event 1.2.1.3: T

Fellow Role-Playing Actors:

1. Login 1.2.1.1: Scheduling Repository 10.0
2. Change Personal Password 1.2.1.12: Scheduling Repository 10.0,
3. Print Calendar 1.2.1.10: Scheduling Repository 10.0,
4. View Calendar 1.2.1.6: Scheduling Repository 10.0,
5. Add Personalization 1.2.1.11: Scheduling Repository 10.0,
6. Build List of Potential Invitees 1.2.1.8: Scheduling Repository 10.0,
7. Query Event 1.2.1.12: Scheduling Repository 10.0,
8. Update Time Zone 1.2.1.5: Scheduling Repository 10.0,
9. Create Calendar Event 1.2.1.2: Scheduling Repository 10.0,
10. Modify Calendar Event 1.2.1.3: Scheduling Repository 10.0

BB006/USYS-0099 - 49 - PATENT

| | | |
|---|---|---|
| Type: | Human | |
| Application External: | True | |
| Owner: | Phil Rossomando | |
| Review Date: | Monday, February 12, 2001 | |
| Quality Grade: | (Note#1) | |
| Sign-off: | English, Art; Clagett, Michel | |
| Phone: xxx@unisys.com | 111-222-3333 | Email: |
| Comments: | (Note#1) | |

Revision History:

| Date | Authors | Description | Version |
|---|---|---|---|
| 2/12/2001 | Phil Rossomando | Created first cut at this Actor specification | 1.0 |

Reference Sources:

David Learner CIO of CAMPER University

References:

RFP Letter from CAMPER University dated: January 12, 2001.

Actor Derived From:

| | | | |
|---|---|---|---|
| 1. | Login User {Virtual} | ID: | N/A |
| 2. | Inviter | ID: | 1.3 |
| 3. | Resource Administrator | ID: | 1.4 |

Assumptions:

1. The PCA will access the CAMPER Scheduling System via an HTTP connection. (TBR #2)

Limitations:

1. The PCA can only schedule personal calendar events not public CAMPER focused events.
2. In the Personal Calendar Administrator role, the PCA can acquire resources notify invitees of a significant event.

Scripts:

<DRAWINGS OF VARIOUS ASPECTS OF USER INTERFACE>

Inflows and Outflows:

| Expectation | Use Case | Receives/Provides |
|---|---|---|
| 1.Event Definition Packet | Create Calendar Event 1.2.1.2 | Provides |
| 2.Event Confirmation Packet (TBD #3) | | Receives |
| 1.Event ID | Delete Calendar Event 1.2.1.4 | Provides |

Metrics:

1. (TBD #1)

Potential Reuse Opportunities:

1. N/A (TBD #2)

TBRs:

1. Should access also be provided via TCP/IP connection? If so, what technology is to be used for its construction (i.e., would we use a ActiveX Components?

TBDs:

1. Any quality metrics to me applied to the PCA?
2. Is this a true observation here?
3. Currently not sure of the expected content of this package.

Notes:

1. To be provided by the reviewers.

BB006/USYS-0099 - 51 - PATENT

Specification of Business Use Case 1.2.1

Business use case Name: Administer Personal Calendar ID: 1.2.1

Project: C# Book Effort Release: 1.0

Phase: Requirements/Initiation Increment: 1.0

Parent Focus Area: Schedule CAMPER University Events Parent ID: 1.2

Description:

This business use case allows the calendar owner to manipulate her personal calendar in the sense that she can query/view it with respect to any given date and/or time. Past dates, the current date and any future dates must be examinable. In addition, the ability to define new events, and delete existing events must also be supported. As part of Personal Calendar Administration, the calendar owner should be able to her calendar with times adjusted so as to reflect her current time zone. Ideally also, it is desired that the Calendar Administrator be given the capability to build and view a persona address book. This list may then be used to identify a list of event attendees.

Participants: Personal Calendar Administrator, Scheduling Repository

Priority: High

Owner: Phil Rossomando

Review Date: Friday, February 09, 2001

Quality Grade: Note1

Sign-off: English, Art; Clagett, Michel

Phone: 111-222-3333 Email: xxx@unisys.com

Comments: Note1

Revision History:

| Date | Authors | Description | Version |
|---|---|---|---|
| 02/07/2001 | Phil Rossomando | Created first cut at this business use case | 1.0 |

| | | specification. | |
|---|---|---|---|

Reference Sources:

David Learner CIO of CAMPER University

References:

RFP Letter from CAMPER University dated: January 12, 2001.

Business Background Inf.:

CAMPER University, because of its phenomenal growth, has determined that its globally distributed staff of educators and administrators are unable to maintain the paper, email and telephone based meeting and event scheduling system currently in place today. Instead, they wish to provide an Internet based system, which is more in line with distance education context.

The school is a Click-and-mortar university with headquarters in Washington DC but globally dispersed with staff and students located in Japan, Great Britain, Finland, Russia, France, the USA and several other countries worldwide. Thus in order to help unify this widely distributed community CAMPER executives feel an Internet-based solution would be most affective. CAMPER desires to provide a small school environment despite its global distribution and virtual presence.

Assumptions:

1. (TBD# 1)

Limitations:

1. Time zone correction will not be performed.
2. The creation of a personal list of potential invitees (i.e., an personal email directory) will not be provided.
3. Schedule modification will not be supported. Users wishing to change an event's attributes must delete that event and recreate it from scratch.
4. The system will not initially support the printing of personal calendars. (TBR1)

Preconditions:

1. Personal meeting scheduling was performed only through telephone, email and snail mail.

Post conditions:

BB006/USYS-0099 - 53 - PATENT

1. The majority of personal meeting scheduling will be done using the new Internet facility.

Invariants:

1. Ability to schedule personal meetings will at no time be jeopardized.

Metrics:

(TBD #1)

Functional Requirements:

Requirement Name: Support Physical Calendar Admin Requirement ID: 1.2.1

Description:

1. The system shall support personal calendar viewing by the calendar owner.
    a. The system shall display to the calendar owner any invitations she
        may have received since her last calendar viewing experience.
2. The system shall support the deletion of calendar events formally created by the calendar owner.
3. The system shall support the creation of new calendar events.
4. The system shall require that the calendar owner present proof of ownership before allowing her to engage in any calendar related administrative activities.
5. The system will support the viewing of individual months, and days within that month.
6. It will also support zooming in on a week within that month and one day within that week and a particular temporal interval within that day.
7. The system will support the notification of special events to the Personal calendar administrator such as birthdays, anniversaries, etc. (TBR #2)
8. The system shall support the printing of personal calendars.
9. The system shall allow for the personalization of calendars to the extent possible.
10. The system shall support the querying of calendar event so as to ascertain associated invitees and resources.
11. The system shall require that a potential user log into the Scheduling System and shall allow a user who has already logged in to change his/her password.

Nonfunctional Requirements:

BB006/USYS-0099 - 54 - PATENT

Requirement Name: Behavioral Constraints     Requirement ID: 1.0

Description:

1. The system shall be able to assign a priority/urgency level to meetings/events.
2. The system shall be available on a 7 x 24 bases. Maintenance must be transparent to the user community.
3. The system shall allow event scheduling to the nearest half hour.
4. The system will not allow the scheduling of simultaneous personal events
5. The system will allow the calendar user to identify a level of importance with a scheduled event.

Keywords:

Scheduling system, meeting scheduling, scheduling, inviter, invitee, schedulable resource

Business Goals Addressed:

Goal Name: Most Connected In the World     Goal Number: 1.0

Description:

The CAMPER student, faculty, and administrative communities shall be the most connected distance education communities in the world. All members of these communities will, through the capabilities provided herein, support CAMPER in its goal to provide a small campus environment to an individual community members distributed around the world.

Potential Reuse Opportunities:

1. The system under development could be used to schedule any schedulable entity, not just meetings.

TBRs:

1. The system will not initially support the printing of personal calendars
2. The system will support the notification of special events to the Personal calendar administrator such as birthdays, anniversaries, etc.

TBDs:

1. Metrics must be collected which will allow the CAMPER support staff to monitor the efficiency and reliability of the developed system however, as of the time of this writing, such metrics have not been identified.
2. Any assumptions associated with this activity must be identified.

Notes:

1. To be filled in by the individual reviewers of this document.

Specification of Use Case 1.2.1.6

Use Case Name: View Calendar 1.2.1.6  Number:

Priority: High  Use Case Type:
Concrete

Project: C# Book Effort  Release: 1.0

Phase: Architecture/Foundation  Increment: 1.0

Focus Area: Administer Personal Calendar  BUC ID: 1.2.1

Purpose: Allow the Personal Calendar owner to view her calendar.

Owner: Phil Rossomando

Review Date: Monday, February 19, 2001

Priority: High  Order For Level: 1.0

Quality Grade: Note1

Sign-off: English, Art; Clagett, Michel

Phone: 111-222-3333  Email:
xxx@unisys.com

Comments: (Note #1)

Revision History:

| Date | Authors | Description | Version |
|---|---|---|---|
| 2/12/2001 | Phil Rossomando | Created first cut at use case specification | 1.0 |

Reference Sources:

David Learner CIO of CAMPER University

BB006/USYS-0099 - 56 - PATENT

References:

RFP Letter from CAMPER University dated: January 12, 2001.

Initiating Actors:

Personal Calendar Administrator (PCA)

Actor Type:

Human

Other Participating Actors:

1. Scheduling Repository

Use Cases Used/Included:

1. None

Use Cases Extended:

1. None

Business Background Inf.:

CAMPER University, because of its phenomenal growth, has determined that its globally distributed staff of educators and administrators are unable to maintain the paper, email and telephone based meeting and event scheduling system currently in place today. Instead, they wish to provide an Internet based system, which is more in line with distance education context.

The school is a Click-and-mortar university with headquarters in Washington DC but globally dispersed with staff and students located in Japan, Great Britain, Finland, Russia, France, the USA and several other countries worldwide. Thus in order to help unify this widely distributed community CAMPER executives feel an Internet-based solution would be most affective. CAMPER desires to provide a small school environment despite its global distribution and virtual presence.

Relative to this use case, the above implies that the calendar interface presented must give the users a feeling of being on a local small campus. The maintenance of a university theme is essential to CAMPER University's vision of itself. Thus, if at all possible personalization options should be seriously considered.

BB006/USYS-0099 - 57 - PATENT

Assumptions:

1. We know The PCA's identity and personal attributes related to her.
   1.1 In addition to demographic information, such date information as
      birthdays, school holidays, anniversaries specific to the PCA should be captured as part of a System Administrative activity.

Limitations:

1. Personalization will not initially be provided. (TBR#1)

Preconditions:

1. The Calendar Administrator has logged into the CAMPER University scheduling environment.
   a. Thus we already know who she is and any other information related to the logon sequence.
   b. The personalization information may exist for this PCA
2. The PCA has selected to view her personal calendar.
3. Access is via the Internet

Invariants:

1. The system must maintain the integrity of the PCA's personal information.

Metrics:

(TBD #1)

Requirements Satisfied:

N/A

Basic Course of Action:

| Step # | Stimulus | Responses | |
| --- | --- | --- | --- |
| | | # | Description |
| 1 | PCA indicates she wants to view her calendar | 1 | The system fetches any personalization inform available for the identified PCA from the Scheduling Repository. |
| | | 2 | The system displays the PCA's calendar as specified by the system default settings. (EXT-POINT as part of this process, a pop-up message identifying any new invitations or notifying her of |

BB006/USYS-0099 - 58 - PATENT

|  |  |  | predefined events about to transpire should be presented to the PCA). (Alt #1) |
| --- | --- | --- | --- |
|  |  | 3 | Use case ends |

Basic Course Post conditions:

The PCA sees her calendar showing a default layout and any events visible within that layout.

Alternative Courses of Action:

Alternative Name:                          Alternative Number:

Personalization Settings found.                1.0

Alternative Course Priority:

N/A All alternate courses will be implemented in this release.

Description:

The system has detected applicable personalization settings for the given PCA. These may include such things as:

1. Personalized calendar layouts (Chosen from a menu of predefined layouts)
2. Holidays, anniversaries, birthdays, and other personal events of significance, etc.
3. What to do relative to invitees and resource acquisition and inability to acquire same for an event.

Branches From:     Basic Course of Action Step 2

| Step # | Stimulus | Responses | |
| --- | --- | --- | --- |
|  |  | # | Description |
| 1 |  | 1 | The system displays the PCA's calendar as specified by her personalization settings. (EXT-POINT as part of this process, a pop-up message identifying any new invitations should be presented to the PCA). |
|  |  | 2 | Return to Basic Course Step 3 |

Alternative Course Post conditions:

BB006/USYS-0099 - 59 - PATENT

The PCA sees her calendar including any personal information and any/all personal scheduled events associated with that chosen personal layout.

Business Rules:

None (TBD#2)

Potential Reuse Opportunities:

The calendar interface being developed here has applicability well beyond the CAMPER context. (Note#1) (TBR#2)

TBRs:

1. Personalization will not initially be provided.
2. Are there any reuse opportunities here?

TBDs:

1. Are there any metrics associated with the Personal Calendar Administration?
2. Do any business rules apply here?
3. Should a periodic pop-up event be provided indicating a meeting is scheduled as is done currently within MS Outlook?

Notes:

1. Check if any off-the-shelf systems already exist to provide this functionality.

What is claimed is:

1. A method for developing software, the method comprising:

defining a focus area which represents:
- a business process to be performed by the software under development; and
- one or more first participants in said business process, at least one of said first participants having a plurality of roles;

decomposing said focus area into one or more sub-focus areas, each of said sub-focus areas including:
- a subset of said business process; and
- one or more second participants in said subset of said business process, each of said second participants having only a single one of said plurality of roles;

creating a use case based on a first one of said one or more sub-focus areas, said use case comprising an instance of usage, by a one of said second participants, of a first subset associated with said first one of said sub-focus areas; and creating source code to perform acts performed in the course of providing said first subset of said business process.

2. The method of claim 1, wherein said decomposing step comprises:

decomposing said first focus area into an intermediate-level focus area which includes:
- a subset of said business process; and
- one or more third participants, at least one or more of said third participants having more than one of said plurality of roles; and further decomposing said intermediate-level focus area to produce a second one of said sub-focus areas.

3. The method of claim 1, wherein said focus area is represented as a specification including a plurality of fields, and wherein said method further comprises:

propagating one or more of said plurality of fields to each of said sub-focus areas; and creating, for each of said sub-focus areas, a set of fields based on the one or more propagated fields.

4. The method of claim 3, wherein said plurality of fields comprises a business background field, and wherein said propagating act comprises propagating said business background field to each of said sub-focus areas.

5. The method of claim 3, wherein said plurality of fields comprises an assumptions field which comprises a set of assumptions, and wherein said propagating act comprises propagating said assumptions field to each of said sub-focus areas.

6. The method of claim 5, wherein said act of propagating said assumptions field comprises propagating fewer than all of the assumptions in said set of assumptions.

7. The method of claim 3, wherein said plurality of fields comprises a functional requirements field, and wherein said propagating act comprises propagating said functional requirements field to each of said sub-focus areas.

8. The method of claim 3, wherein said plurality of fields comprises a business goals field, and wherein said propagating act comprises propagating said business goals field to each of said sub-focus areas.

9. The method of claim 8, wherein said act of propagating said business goals field comprises propagating a sub-goal field.

10. The method of claim 3, wherein said plurality of fields comprises a business goals field, and wherein at least one of said sub-focus areas is an implementation use case, and wherein said propagating act comprises propagating said business goals field to each of said one or more focus areas exclusive of said implementation use case.

11. The method of claim 1, further comprising:

specifying a temporal relationship among at least two of said one or more focus areas.

12. A method for providing computer-assisted software engineering comprising:

receiving first information indicative of a first focus area, said first focus area representing:
- a set of first requirements for software to be developed; and
- a set of first participants in the use of said software;

receiving a division of said set of first requirements which indicates a plurality of separate first aspects of said set of first requirement;

displaying said set of first requirements and said set of first participants;

receiving second information indicative of a second focus area, said second focus area including:
- a set of second requirements for a one of said first aspects; and
- a set of second participants who participate in a use of said one of said first aspects, said second set of participants being based on said first set of participants;

receiving a division of said set of second requirements which indicates a plurality of separate second aspects of said set of second requirements;

displaying said set of second requirements and said set of second participants;

receiving third information which includes:
- a set of third requirements for a one of said second aspects; and
- a set of third participants who participate in a use of said one of said second aspects, each of said third participants having only a single role with respect to said one of said second aspects; and generating a use case based on said third information, said use case defining an instance of the operation of said software by a one of said third participants participating in said one of said second aspects.

13. The method of claim 12, further comprising:

providing a template which comprises a requirements field and a participants field;

and wherein said act of receiving first information comprises:

storing said set of first requirements in said requirements field; and storing said set of first participants in said participants field;

and wherein said act of receiving second information comprises:

storing said set of second requirements in said requirements field; and storing said set of second participants in said participants field;

and wherein said act of receiving third information comprises:

storing said set of third requirements in said requirements field; and storing said set of third participants in said participants field.

14. The method of claim 12, wherein said method further comprises:

providing a template which comprises a plurality of fields which represent a use case;

and wherein said generating act comprises:

displaying said template with at least some of said plurality of fields containing information which is based on said third information.

15. The method of claim 12, wherein:

said first information further comprises a set of first assumptions about said software to be developed;

said second information further comprises a set of second assumptions about said first aspect; and said third information further comprises a set of third assumptions about said second aspect.

16. The method of claim 12, wherein:

said first information further comprises a set of first business goals relating to said software to be developed;

said second information further comprises a set of second business goals relating to said first aspect; and said third information further comprises a set of third business goals relating to said second aspect.

17. The method of claim 12, wherein:

said first information further comprises first business background information relating to said software to be developed;

said second information further comprises second business background information relating to said first aspect; and said third information further comprises third business background information relating to said second aspect.

18. A computer-readable medium encoded with computer-executable instructions which instruct a computing device to perform a method, the method comprising:

receiving first information indicative of a first focus area, said first focus area representing:

a set of first requirements for software to be developed; and a set of first participants in the use of said software;

receiving a division of said set of first requirements which indicates a plurality of separate first aspects of said set of first requirement;

displaying said set of first requirements and said set of first participants;

receiving second information indicative of a second focus area, said second focus area including:

a set of second requirements for a one of said first aspects; and a set of second participants who participate in a use of said one of said first aspects, said second set of participants being based on said first set of participants;

receiving a division of said set of second requirements which indicates a plurality of separate second aspects of said set of second requirements;

displaying said set of second requirements and said set of second participants;

receiving third information which includes:

a set of third requirements for a one of said second aspects; and a set of third participants who participate in a use of said one of said second aspects, each of said third participants having only a single role with respect to said one of said second aspects; and generating a use case based on said third information, said use case defining an instance of the operation of said software by a one of said third participants participating in said one of said second aspects.

19. The computer-readable medium of claim 18 wherein the method further comprises:

providing a template which comprises a requirements field and a participants field;

and wherein said act of receiving first information comprises:

storing said set of first requirements in said requirements field; and storing said set of first participants in said participants field;

and wherein said act of receiving second information comprises:

storing said set of second requirements in said requirements field; and storing said set of second participants in said participants field;

and wherein said act of receiving third information comprises:

storing said set of third requirements in said requirements field; and storing said set of third participants in said participants field.

20. The computer-readable medium of claim 18, wherein the method further comprises:

providing a template which comprises a plurality of fields which represent a use case;

and wherein said generating act comprises:

displaying said template with at least some of said plurality of fields containing information which is based on said third information.

21. The computer-readable medium of claim 18, wherein:

said first information further comprises a set of first assumptions about said software to be developed;

said second information further comprises a set of second assumptions about said first aspect; and said third information further comprises a set of third assumptions about said second aspect.

22. The computer-readable medium of claim 18, wherein:

said first information further comprises a set of first business goals relating to said software to be developed;

said second information further comprises a set of second business goals relating to said first aspect; and said third information further comprises a set of third business goals relating to said second aspect.

23. The computer-readable medium of claim 18, wherein:

said first information further comprises first business background information relating to said software to be developed;

said second information further comprises second business background information relating to said first aspect; and said third information further comprises third business background information relating to said second aspect.

* * * * *